(12) United States Patent
Miller

(10) Patent No.: US 11,596,910 B2
(45) Date of Patent: *Mar. 7, 2023

(54) METHODS AND SYSTEMS FOR IN-LINE MIXING OF HYDROCARBON LIQUIDS

(71) Applicant: MARATHON PETROLEUM COMPANY LP, Findlay, OH (US)

(72) Inventor: Kyle E. Miller, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,570

(22) Filed: Aug. 24, 2022

(65) Prior Publication Data
US 2022/0401898 A1 Dec. 22, 2022

Related U.S. Application Data

(60) Division of application No. 17/856,478, filed on Jul. 1, 2022, which is a continuation-in-part of application
(Continued)

(51) Int. Cl.
*B01F 23/40* (2022.01)
*B01F 35/83* (2022.01)
(Continued)

(52) U.S. Cl.
CPC .............. *B01F 23/49* (2022.01); *B01F 25/53* (2022.01); *B01F 35/833* (2022.01); *B01F 2025/919* (2022.01)

(58) Field of Classification Search
CPC ....... B01F 23/49; B01F 35/83; G05D 11/132; Y10T 137/87281; Y10T 137/8729; Y10T 137/0329

See application file for complete search history.

(56) References Cited

U.S. PATENT DOCUMENTS 2,626,627 A 1/1953 Jung et al.
3,504,686 A 4/1970 Cooper et al.
(Continued)

FOREIGN PATENT DOCUMENTS

AU 2010241217 11/2010
AU 2013202839 5/2014
(Continued)

OTHER PUBLICATIONS

Information Disclosure Declaration by Kyle E. Miller, Dec. 18, 2020.

*Primary Examiner* — Reinaldo Sanchez-Medina
(74) *Attorney, Agent, or Firm* — Womble Bond Dickinson (US) LLP

(57) ABSTRACT

Methods and systems of admixing hydrocarbon liquids from a plurality of tanks into a single pipeline thereof. The system may include two or more tanks positioned at a tank farm each containing a hydrocarbon liquid therein. The system may include two or more first main pipes, each connected to one of the tanks. The system may include two or more main valves, each connected to one of the first main pipes. The system may include two or more second main pipes each connected to a corresponding main valve. The system may include two or more mixing jumpers, each connected to a corresponding first main pipe, each mixing jumper to, when a corresponding main valve is closed, control hydrocarbon liquid. The system may include a mixing pipe, connected to the second main pipes and the mixing jumpers, configured to transport hydrocarbon liquid from one or more of the tanks.

8 Claims, 14 Drawing Sheets

Related U.S. Application Data

No. 17/566,768, filed on Dec. 31, 2021, which is a continuation of application No. 17/247,880, filed on Dec. 29, 2020, now Pat. No. 11,247,184, which is a continuation-in-part of application No. 17/247,700, filed on Dec. 21, 2020, said application No. 17/247,880 is a continuation-in-part of application No. 17/247,704, filed on Dec. 21, 2020, now Pat. No. 10,990,114.

(60) Provisional application No. 62/954,960, filed on Dec. 30, 2019, provisional application No. 62/705,538, filed on Jul. 2, 2020, provisional application No. 63/198,356, filed on Oct. 13, 2020, provisional application No. 62/954,960, filed on Dec. 30, 2019, provisional application No. 62/705,538, filed on Jul. 2, 2020, provisional application No. 63/198,356, filed on Oct. 13, 2020, provisional application No. 63/265,458, filed on Dec. 15, 2021, provisional application No. 63/265,425, filed on Dec. 15, 2021.

(51) Int. Cl.
*B01F 25/53* (2022.01)
*B01F 25/00* (2022.01)

(56) References Cited

U.S. PATENT DOCUMENTS

| | | |
|---|---|---|
| 3,608,869 A | 9/1971 | Woodie |
| 4,320,775 A | 3/1982 | Stirling et al. |
| 4,420,008 A | 12/1983 | Shu |
| 4,488,570 A | 12/1984 | Jiskoot |
| 4,788,093 A | 11/1988 | Murata et al. |
| 4,964,732 A | 10/1990 | Cadeo et al. |
| 5,050,064 A | 9/1991 | Mayhew |
| 5,191,537 A | 3/1993 | Edge |
| 5,469,830 A | 11/1995 | Gonzalez |
| 5,783,916 A | 7/1998 | Blackburn |
| 5,895,347 A | 4/1999 | Doyle |
| 5,906,877 A | 5/1999 | Popper et al. |
| 5,939,166 A | 8/1999 | Cheng et al. |
| 5,993,054 A | 11/1999 | Tan et al. |
| 6,065,903 A | 5/2000 | Doyle |
| 6,077,340 A | 6/2000 | Doyle |
| 6,111,021 A | 8/2000 | Nakahama et al. |
| 6,149,351 A | 11/2000 | Doyle |
| 6,186,193 B1 | 2/2001 | Phallen et al. |
| 6,333,374 B1 | 12/2001 | Chen |
| 6,346,813 B1 | 2/2002 | Kleinberg |
| 6,679,302 B1 | 1/2004 | Mattingly et al. |
| 6,799,883 B1 | 10/2004 | Urquhart et al. |
| 7,032,629 B1 | 4/2006 | Mattingly et al. |
| 7,631,671 B2 | 12/2009 | Mattingly et al. |
| 8,414,781 B2 | 4/2013 | Berard |
| 8,597,380 B2 | 12/2013 | Buchanan |
| 8,748,677 B2 | 6/2014 | Buchanan |
| 9,038,855 B2 | 5/2015 | Lurcott et al. |
| 9,162,944 B2 | 10/2015 | Bennett et al. |
| 9,388,350 B2 | 7/2016 | Buchanan |
| 9,643,135 B1 | 5/2017 | Mazzei et al. |
| 10,501,385 B1 | 12/2019 | Buckner et al. |
| 10,990,114 B1 | 4/2021 | Miller |
| 2002/0178806 A1 | 12/2002 | Valentine |
| 2003/0178994 A1 | 9/2003 | Hurlimann et al. |
| 2004/0125688 A1 | 7/2004 | Kelley et al. |
| 2004/0249105 A1 | 12/2004 | Nolte et al. |
| 2005/0058016 A1 | 3/2005 | Smith et al. |
| 2005/0154132 A1 | 7/2005 | Hakuta et al. |
| 2005/0284333 A1 | 12/2005 | Falkiewicz |
| 2008/0113884 A1 | 5/2008 | Campbell et al. |
| 2008/0115834 A1 | 5/2008 | Geoffrion et al. |
| 2009/0107111 A1 | 4/2009 | Oliver |
| 2009/0175738 A1 | 7/2009 | Shaimi |
| 2009/0183498 A1 | 7/2009 | Uchida et al. |
| 2009/0188565 A1 | 7/2009 | Satake |
| 2010/0031825 A1 | 2/2010 | Kemp |
| 2012/0276379 A1 | 11/2012 | Daniels et al. |
| 2013/0048094 A1 | 2/2013 | Ballantyne |
| 2013/0062258 A1 | 3/2013 | Ophus |
| 2013/0293884 A1 | 11/2013 | Lee et al. |
| 2014/0121622 A1 | 5/2014 | Jackson et al. |
| 2014/0158616 A1 | 6/2014 | Govind et al. |
| 2014/0158632 A1 | 6/2014 | Govind et al. |
| 2014/0171538 A1 | 6/2014 | Daniels et al. |
| 2014/0356707 A1 | 12/2014 | Kwon et al. |
| 2016/0169098 A1 | 6/2016 | Makita |
| 2017/0131728 A1 | 5/2017 | Lambert et al. |
| 2017/0248569 A1 | 8/2017 | Lambert et al. |
| 2017/0253737 A1 | 9/2017 | Auld et al. |
| 2017/0253738 A1 | 9/2017 | Auld et al. |
| 2017/0253806 A1 | 9/2017 | Auld et al. |
| 2017/0259229 A1 | 9/2017 | Chou et al. |
| 2017/0306428 A1 | 10/2017 | Helgason et al. |
| 2017/0367346 A1 | 12/2017 | Rees et al. |
| 2018/0002617 A1 | 1/2018 | Umansky et al. |
| 2018/0223202 A1 | 8/2018 | Fransham et al. |
| 2019/0016963 A1 | 1/2019 | Auld et al. |
| 2019/0121373 A1 | 4/2019 | Panigrahi |
| 2019/0136060 A1 | 5/2019 | Helgason et al. |
| 2019/0338203 A1 | 11/2019 | Umansky et al. |
| 2019/0359899 A1 | 11/2019 | Umansky et al. |
| 2019/0367732 A1 | 12/2019 | Helgason et al. |
| 2021/0232163 A1 | 7/2021 | Miller |

FOREIGN PATENT DOCUMENTS

| | | |
|---|---|---|
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CN | 2092562 U | 1/1992 |
| EP | 3076461 | 10/2016 |
| EP | 3285759 | 2/2018 |
| GB | 2097687 | 11/1982 |
| WO | 1996006685 | 5/1996 |
| WO | 1997006004 | 2/1997 |
| WO | 1997006298 | 2/1997 |
| WO | 1998003711 | 1/1998 |
| WO | 2002030551 | 4/2002 |
| WO | 2003003002 | 1/2003 |
| WO | 2004003293 | 1/2004 |
| WO | 2005018300 | 3/2005 |
| WO | 2007112335 | 10/2007 |
| WO | 2007149851 | 12/2007 |
| WO | 2009055024 | 4/2009 |
| WO | 2013112274 | 8/2013 |
| WO | 2014089443 | 6/2014 |
| WO | 2014173672 | 10/2014 |
| WO | 2015061868 | 5/2015 |
| WO | 2015153607 | 10/2015 |
| WO | 2016004107 | 1/2016 |
| WO | 2016146404 | 9/2016 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| ZA | 199606765 | 2/1998 |
| ZA | 200610366 | 1/2008 |

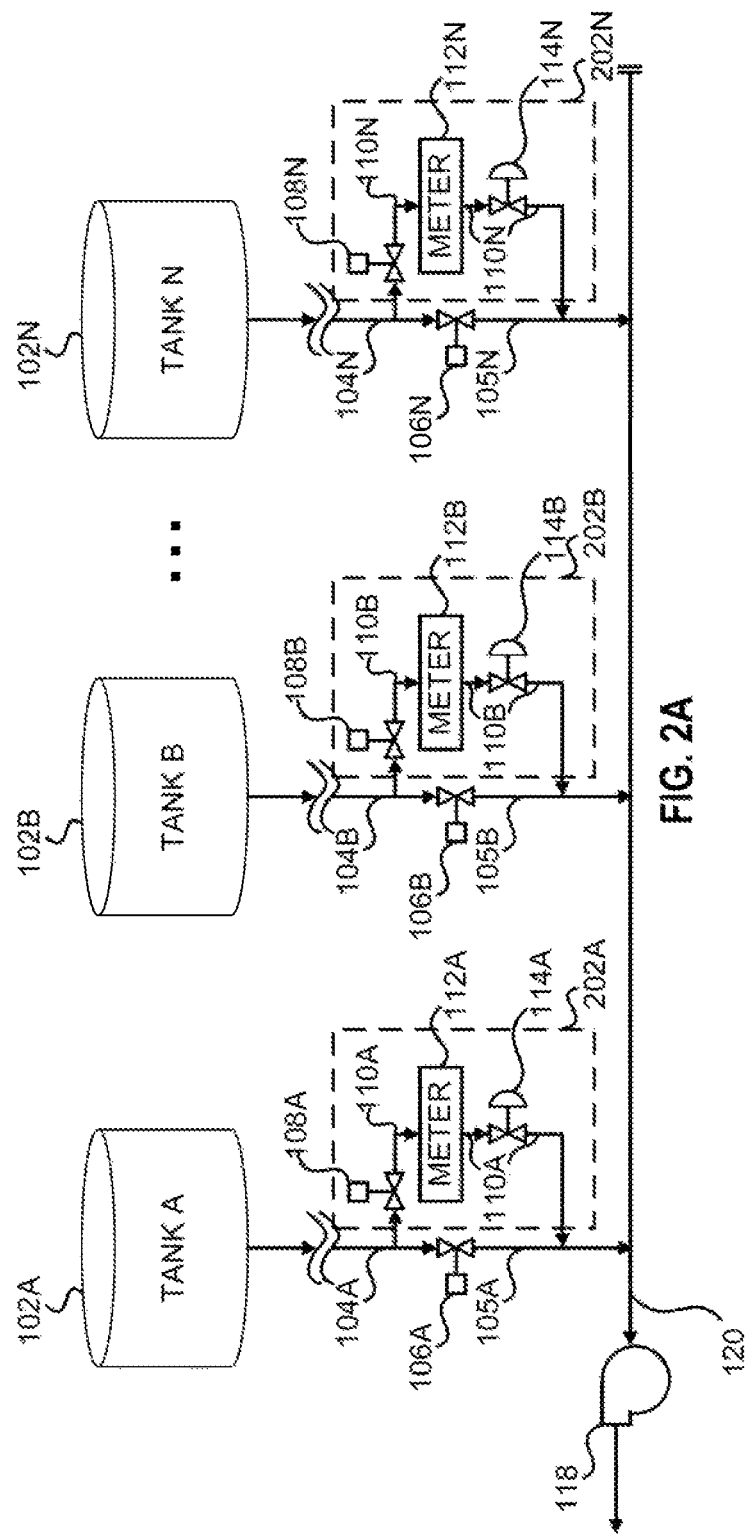

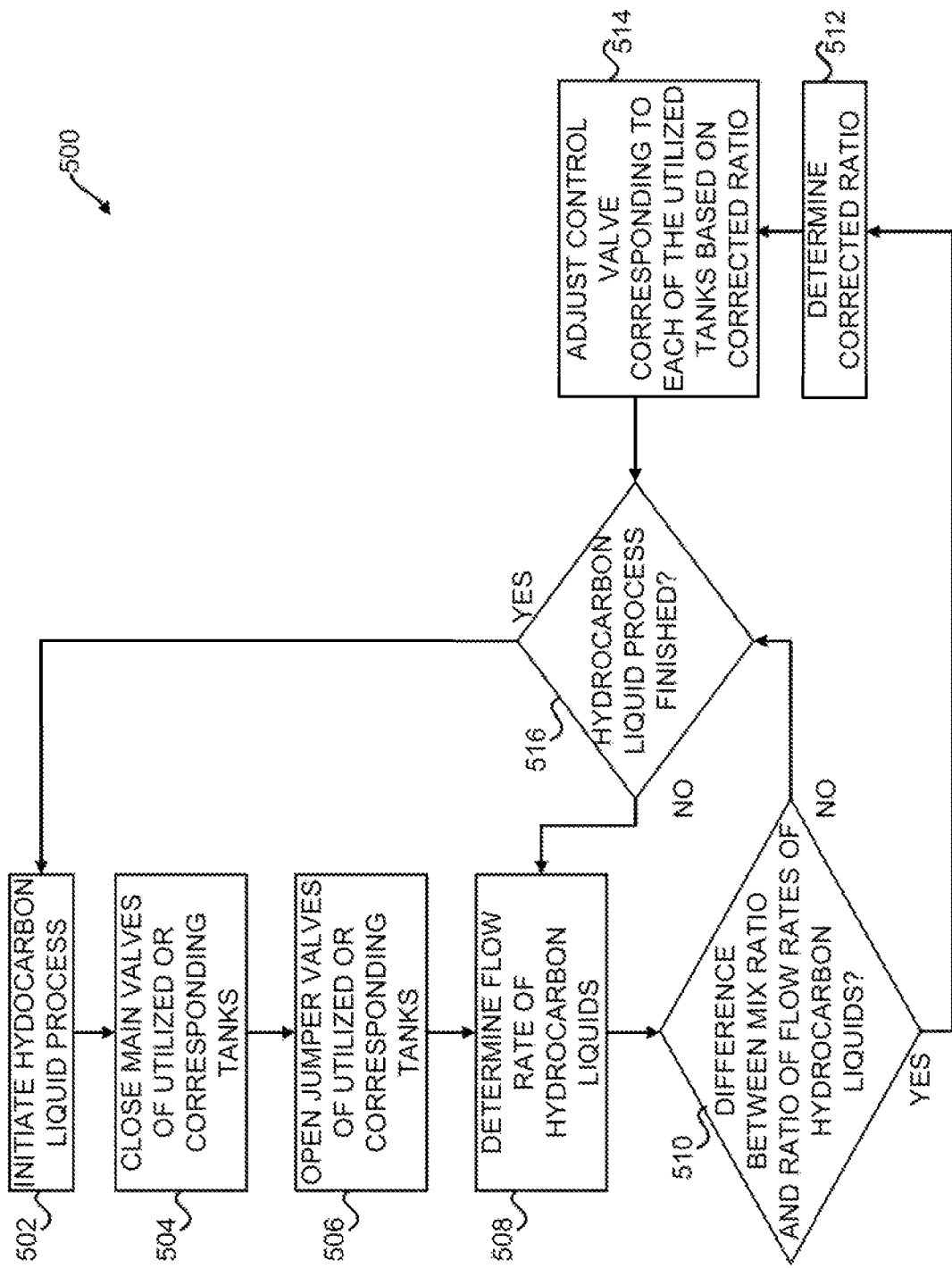

METHODS AND SYSTEMS FOR IN-LINE MIXING OF HYDROCARBON LIQUIDS

CROSS-REFERENCE TO RELATED APPLICATIONS

This application is a divisional of U.S. Non-Provisional application Ser. No. 17/856,478, filed Jul. 1, 2022, titled "METHODS AND SYSTEMS FOR IN-LINE MIXING OF HYDROCARBON LIQUIDS", which claims priority to and the benefit of U.S. Application No. 63/265,458, filed Dec. 15, 2021, titled "METHODS AND SYSTEMS FOR IN-LINE MIXING OF HYDROCARBON LIQUIDS", and U.S. Application No. 63/265,425, filed Dec. 15, 2021, titled "METHODS AND SYSTEMS FOR IN-LINE MIXING OF HYDROCARBON LIQUIDS", the disclosures of which are incorporated herein by reference in their entireties. The present application is also a Continuation-in-Part of U.S. application Ser. No. 17/566,768, filed Dec. 31, 2021, titled "METHODS AND SYSTEMS FOR SPILLBACK CONTROL OF IN-LINE MIXING OF HYDROCARBON LIQUIDS", which is a continuation of U.S. application Ser. No. 17/247,880, filed Dec. 29, 2020, titled "METHODS AND SYSTEMS FOR INLINE MIXING OF HYDROCARBON LIQUIDS BASED ON DENSITY OR GRAVITY", now U.S. Pat. No. 11,247,184, issued Feb. 15, 2022, which is a Continuation-in-Part of U.S. application Ser. No. 17/247,700, filed Dec. 21, 2020, titled "METHODS AND SYSTEMS FOR INLINE MIXING OF HYDROCARBON LIQUIDS BASED ON DENSITY OR GRAVITY", which claims priority to and the benefit of U.S. Provisional Application No. 63/198,356, filed Oct. 13, 2020, titled "METHODS AND SYSTEMS FOR INLINE MIXING OF PETROLEUM LIQUIDS," U.S. Provisional Application No. 62/705,538, filed Jul. 2, 2020, titled "METHODS AND SYSTEMS FOR INLINE MIXING OF PETROLEUM LIQUIDS", and U.S. Provisional Application No. 62/954,960, filed Dec. 30, 2019, titled "METHOD AND APPARATUS FOR INLINE MIXING OF HEAVY CRUDE", the disclosures of which are incorporated herein by reference in their entirety. U.S. application Ser. No. 17/247,880 is also a Continuation-in-Part of U.S. application Ser. No. 17/247,704, filed Dec. 21, 2020, titled "METHODS AND SYSTEMS FOR INLINE MIXING OF HYDROCARBON LIQUIDS", now U.S. Pat. No. 10,990,114, issued Apr. 27, 2021, which claims priority to and the benefit of U.S. Provisional Application No. 63/198,356, filed Oct. 13, 2020, titled "METHODS AND SYSTEMS FOR INLINE MIXING OF PETROLEUM LIQUIDS," U.S. Provisional Application No. 62/705,538, filed Jul. 2, 2020, titled "METHODS AND SYSTEMS FOR INLINE MIXING OF PETROLEUM LIQUIDS", and U.S. Provisional Application No. 62/954,960, filed Dec. 30, 2019, titled "METHOD AND APPARATUS FOR INLINE MIXING OF HEAVY CRUDE", the disclosures of which are incorporated herein by reference in their entireties.

FIELD OF DISCLOSURE

The disclosure herein relates to systems and methods for providing in-line mixing of hydrocarbon liquids using mixing jumpers, and one or more embodiments of such systems and methods may be suitable for providing multi-component mixing of two or more hydrocarbon liquids.

BACKGROUND

Different types of hydrocarbon liquids, such as petroleum and renewable liquid products (e.g., such as crude oil), are often mixed upstream of a refinery to reduce the viscosity of heavy crude and maximize capacity, or to create a desired set of properties (TAN, sulfur, etc.). Given the multitude of crude types, the potential mixtures and component ratios are numerous. In some situations, multiple different types of hydrocarbon liquids, e.g., crude oil and renewable products, from different tanks may need to be mixed in a particular ratio. Further, there may also be a need to create a desired mixture on demand and ship the mixture through a pipeline as one homogenous product. In such examples, the mixing of different types of hydrocarbon liquid, e.g., crude and renewable liquid, may be performed at a pipeline origination station. Often, the pipeline origination station may include a tank farm (e.g., having multiple tanks for storage and mixing of the crude oils) and extensive piping capable of transporting hydrocarbon liquids from each of the tanks to one or more mainline booster pumps, which raise the hydrocarbon liquids to high pressures for traveling on a long pipeline.

Historically, crude mixing occurred by blending the crude oils in one or more tanks. Tank mixing is the most common form of crude mixing in the oil and gas industry. While relatively inexpensive, such methods have several undesirable drawbacks. For example, the extent and/or accuracy of the mixing may be less precise (e.g., having an error rate of +/− about 10% based on a target set point). Such methods typically require an entire tank to be dedicated to blending the crude oils along with separate distribution piping therefrom. In addition, the mixed crude product tends to stratify in the tank without the use of tank mixers, which also require additional capital investment. Further, the mixed crude product is generally limited to a 50/50 blend ratio.

An alternative to tank mixing is parallel mixing, which uses two pumps to pump two controlled feed streams (e.g., one pump per feed stream) on demand from separate tanks and into the pipeline. While parallel mixing is typically more precise than tank mixing, it is also more difficult to control because both streams are pumped by booster pumps into a common stream. Typically, the two pumped streams are individually controlled by variable speed pumps or pumps with flow control valves; therefore, the two sets of independent controls may interfere with each other and/or may have difficulty reaching steady state if not programmed correctly.

Applicant has recognized, however, that in parallel mixing operations, both streams need to be boosted to about 50-200 psi of pressure in the tank farm to provide adequate suction pressure to a mainline booster pump that is positioned downstream of the boosters. Even if one stream operates at a fixed flow while the other varies, the need to boost the pressure of each stream to about 50-200 psi may require high horsepower boost pumps dedicated to each line. Such dedicated pumps may be needed to supply streams at adequate pressure to the mainline pumps and may require significant capital investment. From a commercial standpoint, for example, parallel mixing operations require much more infrastructure, representing a 180% to 200% increase in cost difference compared to the in-line mixing systems disclosed herein. Therefore, there is a need in the industry for accurate and cost-effective blending methods and systems for crude and other hydrocarbon liquid products.

SUMMARY

The disclosure herein provides embodiments of systems and methods for in-line fluid mixing of hydrocarbon liquids. In particular, in one or more embodiments, the disclosure provides for in-line mixing via mixing jumpers from tanks positioned at a tank farm. Such systems and methods may enable each of two or more tanks to provide a single hydrocarbon liquid as a product, via a larger pipeline, or enable two of the two or more tanks to provide a blend of hydrocarbon liquids as a blended product via corresponding mixing jumpers. In other words, the in-line mixing system is positioned to admix two or more of those hydrocarbon liquids contained within the two or more of tanks to provide a blended mixture within a single pipeline. In some embodiments, the systems and methods of the disclosure may provide for in-line mixing of at least two hydrocarbon liquids, at least three hydrocarbon liquids, or more to form a blended fluid flow in a single pipeline, e.g., which may be referred to herein as two-component blend, three-component blends, or a blend containing more than three hydrocarbon liquids. Further, such embodiments, may provide the blended mixture efficiently and utilizing a low or a minimal amount of power.

The mixing jumpers utilized in such operations may be comprised of pipes, an isolation valve, a meter and/or sensor, and/or a flow control device. The flow control device may be a control valve. Other devices may be utilized such as a turbine, a pump (e.g., a variable speed pump or fixed pump), a control valve and pump, or some combination thereof. The mixing jumper may allow fluid to flow therethrough when the isolation valve is opened. In an embodiment, opening the isolation valve prevents flow through a corresponding tank's main pipe. In another embodiment, the tank's main pipe may include an isolation valve to prevent/allow fluid to flow therethrough. The meter and/or sensor may determine the amount of fluid flowing through, or some other characteristics or aspect of the fluid, the mixing jumper. The meter and/or sensor may be a flow meter and/or a pressure sensor. Other meters and/or sensors may be positioned throughout the system, such as tank level meters, temperature sensors, and/or other flow meters or pressure sensors. The flow control device may allow for control of a final blend. For example, a blend may include 40% of a fluid from tank A and 60% of another fluid from tank B. In such examples, the flow control devices may adjust to drive the blend to a correct ratio, based on measurements from, at least, the meter and/or sensor.

Accordingly, an embodiment of the disclosure is directed to an in-line fluid mixing system. The in-line fluid mixing system may be positioned at a tank farm to admix hydrocarbon liquids from a plurality of tanks into a single pipeline. The in-line fluid mixing system may comprise two or more tanks positioned at a tank farm with at least one tank containing a hydrocarbon liquid therein. The in-line fluid mixing system may comprise two or more first main pipes. Each one of the two or more main pipes may be connected to one of the two or more tanks. The in-line fluid mixing system may comprise two or more main valve. Each of the two or more main valves may be connected to one of the two or more main pipes. The hydrocarbon liquid may flow from one tank through one first main pipe to a corresponding main valve. The in-line fluid mixing system may comprise two or more second main pipes. Each one of the two or more second main pipes may be connected to a corresponding main valve. The in-line fluid mixing system may comprise two or more mixing jumpers. Each of the mixing jumpers may be connected to a corresponding first main pipe of the two or more first main pipes. Each of the two or more mixing jumpers may, when a corresponding main valve is closed, control hydrocarbon liquid flowing from two or more tanks. The in-line fluid mixing system may comprise a mixing pipe or a header connected to each of the two or more second main pipes and each of the two or more mixing jumpers. The mixing pipe may be configured to transport hydrocarbon liquid from one or more of the two or more tanks. The in-line fluid mixing system may include one or more controllers in signal communication with the isolation valve, the sensor, and the flow control device of each of the mixing jumpers and with each of the one or more main valves. The one or more controllers may control the flow control device for each of the one or more mixing jumpers thereby to control an amount of hydrocarbon liquid flowing therethrough. Such control may be based on one or more of a specified hydrocarbon liquid blend percentage and a current flow rate, from a corresponding sensor, of a specified hydrocarbon liquid flowing from a specified tank The mixing jumpers described above may include an isolation valve to, when closed, prevent hydrocarbon liquid to flow therethrough and, when open, allow hydrocarbon liquid to flow therethrough. Further, the mixing jumper, may include a sensor to determine a characteristic (e.g., flow rate, pressures, temperature, viscosity, and/or other characteristics) of hydrocarbon liquid flowing through the one of the one or more mixing jumpers. The sensor may include one or more of a flow meter, density sensor, pressure sensor or transducer, or a temperature sensor. The mixing jumper may also include a flow control device to control hydrocarbon liquid flowing through the one of the one or more mixing jumpers. The flow control device may be or include one or more of a control valve or a turbine. The mixing jumper may finally include a mixing jumper pipe to connect the mixing jumper to the mixing pipe or corresponding second main pipe.

In an embodiment, when one of the one or more main valves is open and hydrocarbon liquid is flowing therethrough, each of the isolation valves for the one or more mixing jumpers may be closed, thus preventing fluid flow through the mixing jumpers.

Another embodiment of the disclosure is directed to a method of admixing hydrocarbon liquids from two or more tanks into a single pipeline to provide in-line mixing thereof. The method may include initiating a hydrocarbon liquid process that includes blending specified percentages of two or more hydrocarbon liquids over a period of time each of the two or more hydrocarbon liquids stored in one of two or more tanks. The method may include closing, for each one of the two or more tanks, a main valve. The method may include opening, for each one of the two or more tanks, an isolation valve of a mixing jumper. The method may include determining, for the mixing jumper of each one of the two or more tanks, a flow rate of hydrocarbon liquid. The method may include, in response to a difference between a mix ratio and a ratio of each determined flow rate of hydrocarbon liquid: (1) determining a corrected ratio based on one or more of the difference between the mix ratio, the ratio of each determined flow rate of hydrocarbon liquid, or one or more of each flow rate of each hydrocarbon liquid, and (2) adjusting a flow control device of the mixing jumper for each of the two or more tanks based on the corrected ratio to modify flow rate of hydrocarbon liquid to drive the ratio towards the target ratio.

Another embodiment of the disclosure is directed to a method of admixing liquid from two or more tanks into a single pipeline to provide in-line mixing thereof. The method may include receiving blend parameters of a blend process. The blend parameters may include specified or selected percentages of one or more hydrocarbon liquids. The method may include, in response to blend parameters with two or more specified percentages of two or more hydrocarbon liquids, (1) opening, for each of the corresponding tanks, a jumper valve of a mixing jumper and (2) closing, for each of the corresponding tanks, a main valve. Each of the two or more hydrocarbon liquids may be stored in the corresponding tanks. The method may further include determining, for the mixing jumper of each of the corresponding tanks, a flow rate of hydrocarbon liquid. The method may include, in response to a difference between a mix ratio and a ratio of each determined flow rate of hydrocarbon liquid, (1) determining a corrected ratio based on one or more of the difference between the mix ratio, the ratio of each determined flow rate of hydrocarbon liquid, or one or more of each flow rate of each hydrocarbon liquid, and (2) adjusting a flow control device of the mixing jumper for each of the corresponding tanks based on the corrected ratio to modify flow rate of hydrocarbon liquid to drive the ratio towards the target ratio. In an embodiment, the corrected ratio may further be based on one or more of a density of each of the two or more hydrocarbon liquids or a level of hydrocarbon liquid in each of the corresponding tanks.

In another embodiment, the method may include, in response to blend parameters with a specified percentage of one hydrocarbon liquid, (1) opening, for a corresponding tank, a main actuated valve to allow the one hydrocarbon liquid to flow to a header therethrough for a selected time, and (2) closing, for the corresponding tank, a jumper actuated valve of a mixing jumper to prevent flow of the one hydrocarbon liquid through the mixing jumper.

Another embodiment of the disclosure is directed to a controller for an in-line mixing system for admixing hydrocarbon liquids from one or more tanks into a single pipeline via mixing jumpers. The controller may include a first input in signal communication with a first meter to measure a first flow rate of the first liquid. The first meter may be positioned along a first mixing jumper that is connected to a first tank. The controller may be configured, in relation to the first input, to obtain the first flow rate from the first meter via the first input after initiation of a blending operation. The controller may include a second input in signal communication with a second meter to measure a second flow rate of the second liquid. The second meter may be positioned along a second mixing jumper that is connected to a second tank. The controller may be configured to, in relation to the second input, obtain the second flow rate from the second meter via the second input after initiation of the blending operation. The controller may include an input/output in signal communication with a first control valve and a second control valve. The first control valve may be designed to adjust flow of the first liquid via the first mixing jumper thereby modifying the first flow rate. The second control valve may be designed to adjust flow of the second liquid via the second mixing jumper thereby modifying the second flow rate. The controller, in relation to the input/output, may be configured to, after initiation of the blending operation: (1) determine whether one or more of the first flow rate or the second flow rate are to be modified based on one or more of a target mix ratio, a ratio of the first flow rate and second flow rate, the first flow rate, or the second flow rate; and (2) in response to a determination that the first flow rate is to be modified, adjust a position of the first flow control valve that adjusts flow through the first mixing jumper, thereby modifying the first flow rate; and (3) in response to a determination that the second flow rate is to be modified, adjust a position of the second flow control valve that adjusts flow through the second mixing jumper, thereby modifying the second flow rate.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

FIG. 2A, FIG. 2B, FIG. 2C, and FIG. 2D are schematic block diagrams of respective N-component in-line mixing systems positioned at a tank farm to admix up to N amount of hydrocarbon liquids from separate tanks into a single pipeline, according to embodiments of the disclosure.

FIG. 5 is another flow diagram of a method for managing a multi-component in-line mixing system according to an embodiment of the disclosure

DETAILED DESCRIPTION

Figure 1A:
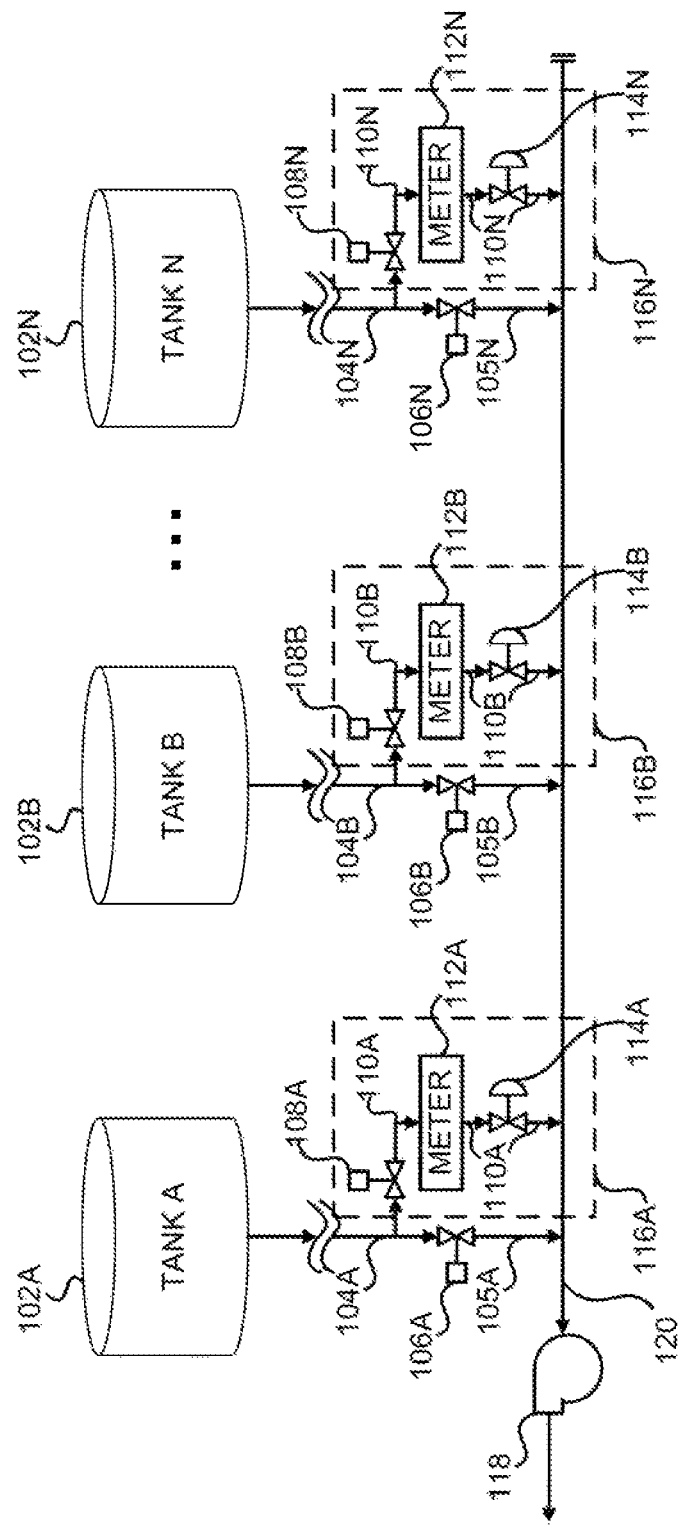
FIG. 1A, FIG. 1B, FIG. 1C, FIG. 1D, FIG. 1E, and FIG. 1F are schematic block diagrams of respective N-component in-line mixing systems positioned at a tank farm to admix up to N amount of hydrocarbon liquids from separate tanks into a single pipeline, according to embodiments of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure provides embodiments of systems and methods for in-line fluid mixing of hydrocarbon fluids and/or liquids. "Hydrocarbon liquids" as used herein, may refer to petroleum liquids, renewable liquids, and other hydrocarbon based liquids. "Petroleum liquids" as used herein, may refer to liquid products containing crude oil, petroleum products, and/or distillates or refinery intermediates. For example, crude oil contains a combination of hydrocarbons having different boiling points that exists as a viscous liquid in underground geological formations and at the surface. Petroleum products, for example, may be produced by processing crude oil and other liquids at petroleum refineries, by extracting liquid hydrocarbons at natural gas processing plants, and by producing finished petroleum products at industrial facilities. Refinery intermediates, for example, may refer to any refinery hydrocarbon that is not crude oil or a finished petroleum product (e.g., such as gasoline), including all refinery output from distillation (e.g., distillates or distillation fractions) or from other conversion units. In some non-limiting embodiments of systems and methods, petroleum liquids may include heavy blend crude oil used at a pipeline origination station. Heavy blend crude oil is typically characterized as having an American Petroleum Institute (API) gravity of about 30 degrees or below. However, in other embodiments, the petroleum liquids may include lighter blend crude oils, for example, having an API gravity of greater than 30 degrees. "Renewable liquids" as used herein, may refer to liquid products containing plant and/or animal derived feedstock. Further, the renewable liquids may be hydrocarbon based. For example, a renewable liquid may be a pyrolysis oil, oleaginous feedstock, biomass derived feedstock, or other liquids, as will be understood by those skilled in the art. The API gravity of renewable liquids may vary depending on the type of renewable liquid.

In particular, in one or more embodiments, the disclosure provides an in-line mixing system that may be positioned at a tank farm that includes a plurality of tanks configured to store one or more hydrocarbon liquids. Such an in-line mixing system may provide admixing of two or more of those hydrocarbon liquids contained within the plurality of tanks to provide a blended mixture within a single pipeline. In some embodiments, the systems and methods of the disclosure may provide for in-line mixing of at least two hydrocarbon liquids, at least three hydrocarbon liquids, or more than three hydrocarbon liquids to form a blended fluid flow in a single pipeline, e.g., which may be referred to herein as two-component blends, three-component blends, or a blend containing more than three hydrocarbon liquids. Advantageously, in-line mixing operations (sometimes referred to as "series mixing") may utilize one or more controlled, tank output streams (e.g., controlled via a mixing jumper including a flow control device among other devices and/or sensors), all of which are upstream of a common booster pump used to pump a blended fluid stream through a pipeline. Further, the in-line mixing system may include sensors, disposed throughout the tank farm, to determine various fluid characteristics, allowing for the in-line mixing system to blend the hydrocarbon liquids according to a target blend percentage, density, and/or gravity, providing a precisely blended fluid or liquid stream. Further, based on the configuration of such an in-line mixing system, any number of component blends or simply a single fluid may be formed or transported with low energy utilization.

In some embodiments, the systems and methods as described herein may provide for in-line, on-demand, blending of crude oil, other hydrocarbon liquids, and/or renewable liquids at a pipeline origination station. A pipeline origination station is typically located at or near a tank farm (e.g., having a plurality of tanks containing hydrocarbon liquids). The pipeline origination station includes extensive piping capable of transporting the hydrocarbon liquids from each of the nearby tanks in the tank farm to one or more mainline booster pumps, which raise the hydrocarbon liquids to very high pressures for passage through the long pipeline. A "tank farm" as used herein, refers to a plurality of tanks positioned in an area, each of the plurality of tanks configured to hold one or more hydrocarbon liquids therein. In some embodiments, the plurality of tanks may be positioned proximate to each other or the plurality of tanks may be spread out across a larger area. In some embodiments, the plurality of tanks may be positioned sequentially such that each tank is equally spaced apart. Generally, the number of individual tanks in a tank farm may vary based on the size of the pipeline origination station and/or based on the amount of hydrocarbon liquids being stored in that facility. For example, the tank farm may include at least 2, at least 4, at least 6, at least 8, at least 10, at least 12, or more individual tanks within the tank farm.

As noted above, typical pipeline origination stations require blending of two or more different hydrocarbon liquids in a blending tank prior to pumping the blended hydrocarbon liquids from the blending tank itself. However, the systems and methods of this disclosure advantageously provide in-line, on-demand mixing directly in a pipe in the tank farm prior to the blended liquid being pumped to the pipeline. Such pipe blending may eliminate stratification of mixed oil in tanks and does not require the use of individual tank mixers in each of the tanks. These systems and methods may also eliminate the need to mix the hydrocarbon liquids in one or more tanks before the hydrocarbon liquids are pumped therefrom, which advantageously allows for the changing of the blend on-demand and on-demand blending during operation of the pipeline origination station. In some embodiments, for example, a separate blending tank in the tank farm is not necessary, and thus, one or more tanks in the tank farm previously used for blending may beneficially be used for storage of additional hydrocarbon liquids, which may also be blended in-line. Further, basing blending operations on various measurements of fluids to be mixed (e.g., flow and/or density or gravity) may increase accuracy and precision of blending.

Other typical pipeline origination stations may use parallel mixing of two or more hydrocarbon liquids, which may be expensive and of lower efficiency. In particular, typical parallel mixing operations require a dedicated high horsepower mixing booster pump (e.g., greater than 750 hp, greater than 850 hp, greater than 950 hp or even greater than 1050 hp) for each of the mixing streams and an additional static mixer to blend the hydrocarbon liquids pumped through each of the mixing streams. However, the systems and methods of this disclosure advantageously provide cost and energy savings, because such systems and methods do not require high horsepower mixing booster pumps or the additional static mixer. For example, the mixing booster pumps, if any are utilized, typically used in the mixing streams of the systems and methods described herein, have lower horsepower ratings (e.g., less than 250 hp, less than 200 hp, less than 150 hp, or even less than 100 hp). In addition, the in-line mixing systems, according to this disclosure, may eliminate the need for any pumps, other than the downstream booster pump to transport fluids to other locations, while including an amount of isolation valves and control valves (e.g., one of each for each of the streams). An isolation valve may include an electrically actuated valve, a hydraulically actuated valve, a manually actuatable valve, a maintenance valve, and/or any valve configured to open or close based one or more of a transmitted signal or manual actuation. A control valve may include a valve configured to open to various positions, based one or more of a transmitted signal or manual actuation, to control a flow of fluid. Such isolation valves and control valves may utilize little power in relation to pumps, fixed or variable speed, and, in some embodiments, may utilize no power, as actuation is performed manually. The other devices utilized in such a tank farm may utilize low power as well, e.g., sensors and/or meters. Further, in-line mixing systems as described herein may provide for more accurate control of blended hydrocarbon liquids, for example, within 1.0 percent or less of the desired set point (e.g., desired flow rate and/or density or gravity) for the blended fluid flow.

FIG. 1A, FIG. 1B, FIG. 1C, FIG. 1D, FIG. 1E, and FIG. 1F depict process diagrams of a non-limiting, N-component in-line mixing system positioned at a tank farm to admix up to N amount of hydrocarbon liquids from separate tanks into a single pipeline, according to embodiments of the disclosure. Turning first to FIG. 1A, the in-line mixing system may include two or more tanks 102A up to 102N (e.g., tank A 102A, tank B 102B, and up to tank N 102N). The tanks 102A-102N may store various hydrocarbon fluids or liquids. Such hydrocarbon fluids or liquids may include petroleum liquids and/or renewable liquids. The tanks 102A-102N may be filled completely or partially prior to a blending operation. In another embodiment, during a blending operation the tanks 102A-102N may be re-filled. Such actions may alter the flow rate from such tanks 102A-102N, as well as, in some examples, the density or gravity of the hydrocarbon fluid or liquid therein. Further, as a tank empties during a blending operation, the flow rate may change (e.g., as a tank level decreases, the flow rate from the tank may decrease). Further still, other factors may affect flow rate from a tank, e.g., liquid viscosity, density, distance from mixing pipe 120, pipe diameter, and/or other characteristics. The diameter of first main pipe 104A-104N and second main pipe 105A-105N may be about 36 inches, while the diameter of the mixing jumper pipe 110A-110N may be about 16 inches to about 17 inches, about 16 inches to about 18 inches, about 16 inches to about 19 inches, about 16 to about 20 inches, about 17 inches to about 18 inches, about 17 inches to about 19 inches, about 17 to about 20 inches, about 18 inches to about 19 inches, about 18 to about 20 inches, about 19 inches to about 20 inches, about 16 inches, about 17 inches, about 18 inches, about 19 inches, or about 20 inches, thereby allowing for greater control of flow from the tanks 102A-102N when utilizing the mixing jumper 116A-116N. In an embodiment, the first main pipe 104A-104N and second main pipe 105A-105N may be a larger or smaller than 36 inches in diameter. In such an embodiment, the mixing jumper pipe 110A-110N may be sized less than first main pipe 104A-104N and second main pipe 105A-105N. For example, if the first main pipe 104A-104N and second main pipe 105A-105N include a 16-inch diameter, then the mixing jumper pipe 110A-110N may be about 12 inches or less in diameter. Various other sizes of pipe may be used based on the type of blending operations to be performed. Size of the first main pipe 104A-104N and second main pipe 105A-105N may be selected to minimize pressure drop and/or increase flow of fluid.

The in-line mixing system may include pipes corresponding to each of the tanks 102A-102N. A first main pipe 104A-104N or an output pipe may connect, at a first end of the first main pipe 104A-104N, each of the tanks 102A-102N to an isolation valve, at second end of the first main pipe 104A-104N. In other words, the isolation valve may be positioned along the first main pipe 104A-104N. Fluid flowing from the tanks 102A-102N may flow through the first main pipe 104A-104N to the isolation valve. As depicted in FIG. 1A, two isolation valves (e.g., isolation valves 106A-106N and isolation valves 108A-108N) may control flow to different pipes (e.g., second main pipe 105A-105N and mixing jumper 116A-116N, respectively). For example, isolation valves 106A-106N may control (e.g., prevent or allow) flow through the first main pipe 104A-104N to the second main pipe 105A-105N. Isolation valves 108A-108N may control (e.g., prevent or allow) flow through first main pipe 104A-104N to the mixing jumpers 116A-116N. In an embodiment, when one isolation valve is open, the other isolation valve may be closed (e.g., if isolation valve 106A-106N is open then isolation valve 108A-108N are closed and if isolation valve 108A-108N is open then isolation valves 106A-106N are closed). The isolation valves (e.g., isolation valves 106A-106N and isolation valves 108A-108N) may fully open or fully close, rather than opening or closing to different positions or degrees/percentages. In another embodiment, rather than utilizing isolation valves, the in-line mixing system may utilize control valves. Control valves, as used herein, may open or close to varying positions or different degrees or percentages open or closed.

As noted, the in-line mixing system may include a mixing jumper 116A-116N. The mixing jumper 116A-116N may control the flow from a corresponding tank 102A-102N (e.g., when two or more isolation valves 106A-106N are closed and two or more isolation valves 1-8A-108N are open allowing fluid to flow from the tanks 102A-102N through the first main pipe 104A-104N to the mixing jumper 116A-116N). In an embodiment, if one tank is providing fluid to mixing pipe 120 (e.g., isolation valve 106A-106N is open and isolation valves 108A-108N is closed), then no other tank in the in-line mixing system may provide fluid to the mixing pipe 120. In other words, if the main pipe 106A-106N is in use for one tank for a blending operation (e.g., a single component blend), then no other tank may be utilized in such a blending operation, either via main pipe or mixing jumper corresponding to the other tank.

The mixing jumper 116A-116N may include a number of devices or components. The mixing jumper 116A-116N may include a mixing jumper pipe 110A-110N, isolation valve 108A-108N, a meter 112A-112N, and/or control valve 114A-114N. The mixing jumper 116A-116N may include more or less additional devices or components. Further, other components may be used in place of the components listed. For example, a pump may be utilized rather than or in addition to the control valve 114A-114N. In another embodiment, a turbine may be utilized rather than or in addition to the control valve 114A-114N. In such an embodiment, the turbine may control the flow rate through the mixing jumper 116A-116N, while in turn generating electrical power. Such electrical power may be utilized to power devices or components of the in-line mixing system or may be stored in on-site energy storage devices (e.g., batteries or capacitor based energy storage devices). Further, in such embodiments, the turbines may limit flow therethrough based on a gearbox corresponding to the turbine or based on a variable resistance rotor, or some combination thereof.

In an embodiment, once a blend operation is initiated isolation valves 106A-106N may close and isolation valves 108A-108N corresponding to tanks 102A-102N utilized in the blending operation may be opened, allowing fluid to flow from selected tanks 102A-102N through the first main pipe 104A-104N and isolation valve 108A-108N to the mixing jumpers 116A-166N. The control valves 114A-114N corresponding to tanks 102A-102N utilized in the blending operation may be opened to a specified position, based on, for example, the percentage of fluids to be blended. As a blending operation begins, flow rates, as noted above, may vary over time, potentially altering the blend percentage. As such, each mixing jumper 116A-116N may include a meter 112A-112N or sensor to measure one or more characteristics of the fluid flowing from a corresponding tank 102A-102N. For example, the meter 112A-112N may measure the flow rate from the corresponding tank 102A-102N. A controller (e.g., controller 122 as depicted in FIG. 1D) may receive the flow rate and/or other characteristic as measured by each meter 112A-112N or other sensors. Based on the flow rates, the controller (e.g., controller 122) may determine a current blend ratio (e.g., the amount of fluid being blend from each tank in relation to the total blend). The controller may compare the current ratio to a specified blend ratio. Based on a difference between the current ratio and the specified blend ratio, the controller may transmit a signal to corresponding control valves 114A-114N indicating a position that each control valve 114A-114N may adjust to. Such measurements and adjustments may occur continuously, substantially continuously, or at specified time intervals.

As depicted in FIGS. 1A-1E, the mixing jumper 116A-116N may include an inlet to connect to the first main pipe 104A-104N and an outlet to directly connect to the mixing pipe 120. The mixing pipe 120 may comprise a pipe of a different or the same diameter as the first main pipe 104A-104N and second main pipe 105A-105N (e.g., about 36 inches) or the mixing jumper pipe 110A-110N (e.g., about 30 inches or less or some other diameter less than that of the first main pipe 104A-104N and second main pipe 105A-105N).

Figure 1B:
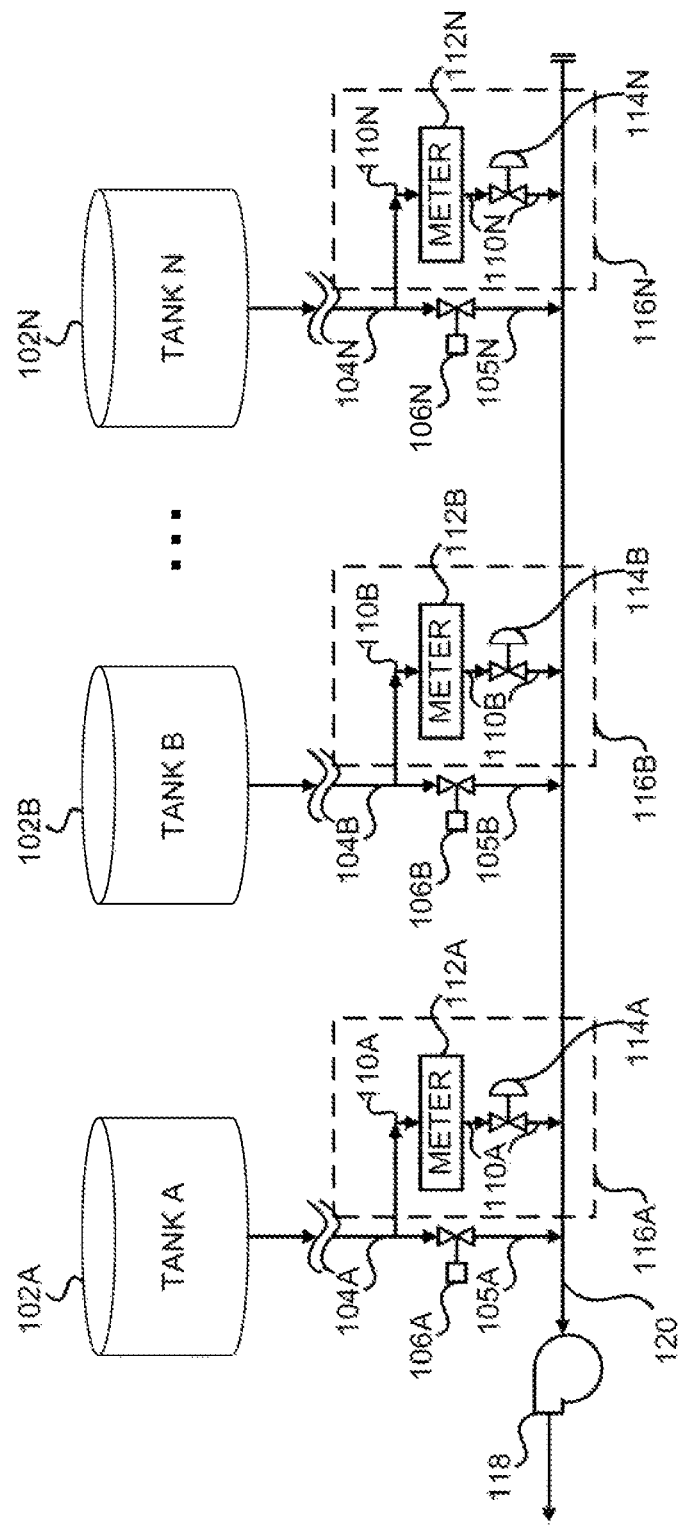

As depicted in FIG. 1B, the in-line mixing system may include one isolation valve 106A-106N positioned along the main pipe, while omitting isolation valve 108A-108N. As such, when the isolation valve 106A-106N is open, fluid may flow through the first main pipe 104A-104N and second main pipe 105A-105N. When the isolation valve 106A-106N is closed, fluid may flow through the mixing jumper 116A-116N.

Figure 1C:
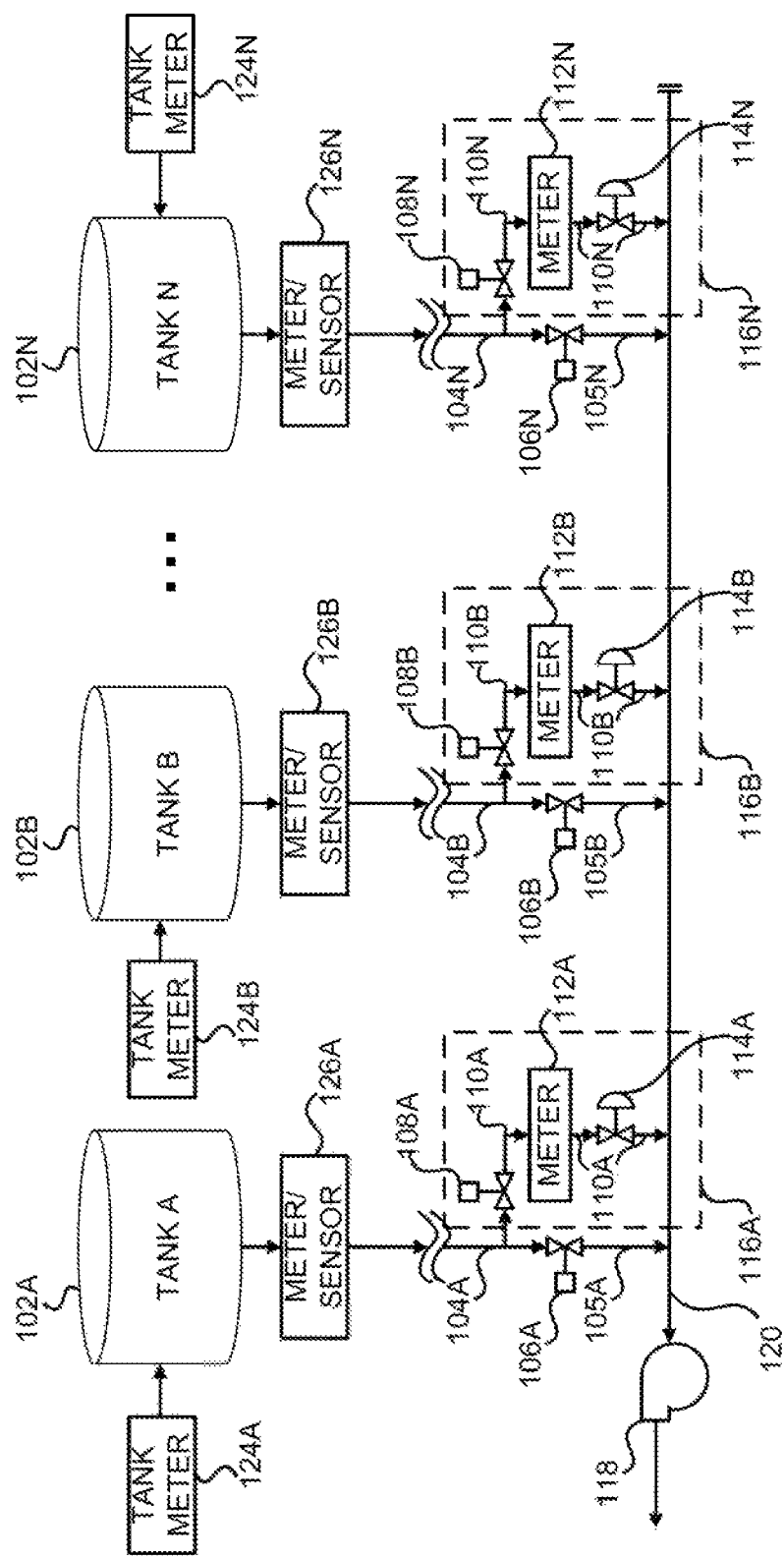
Figure 1D:
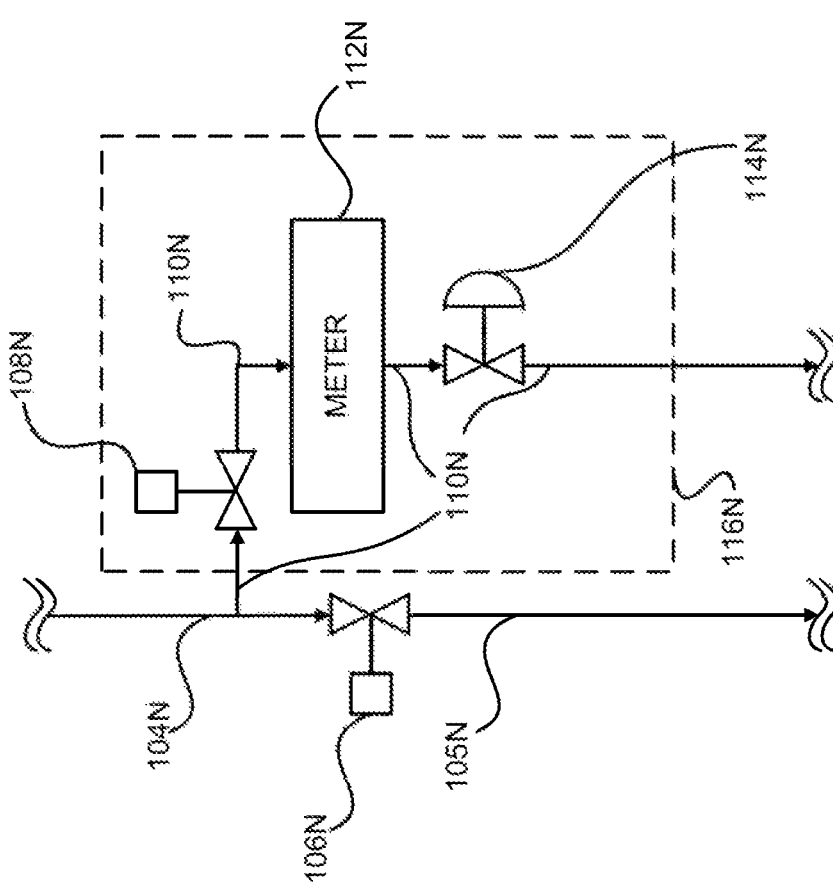
Figure 1E:
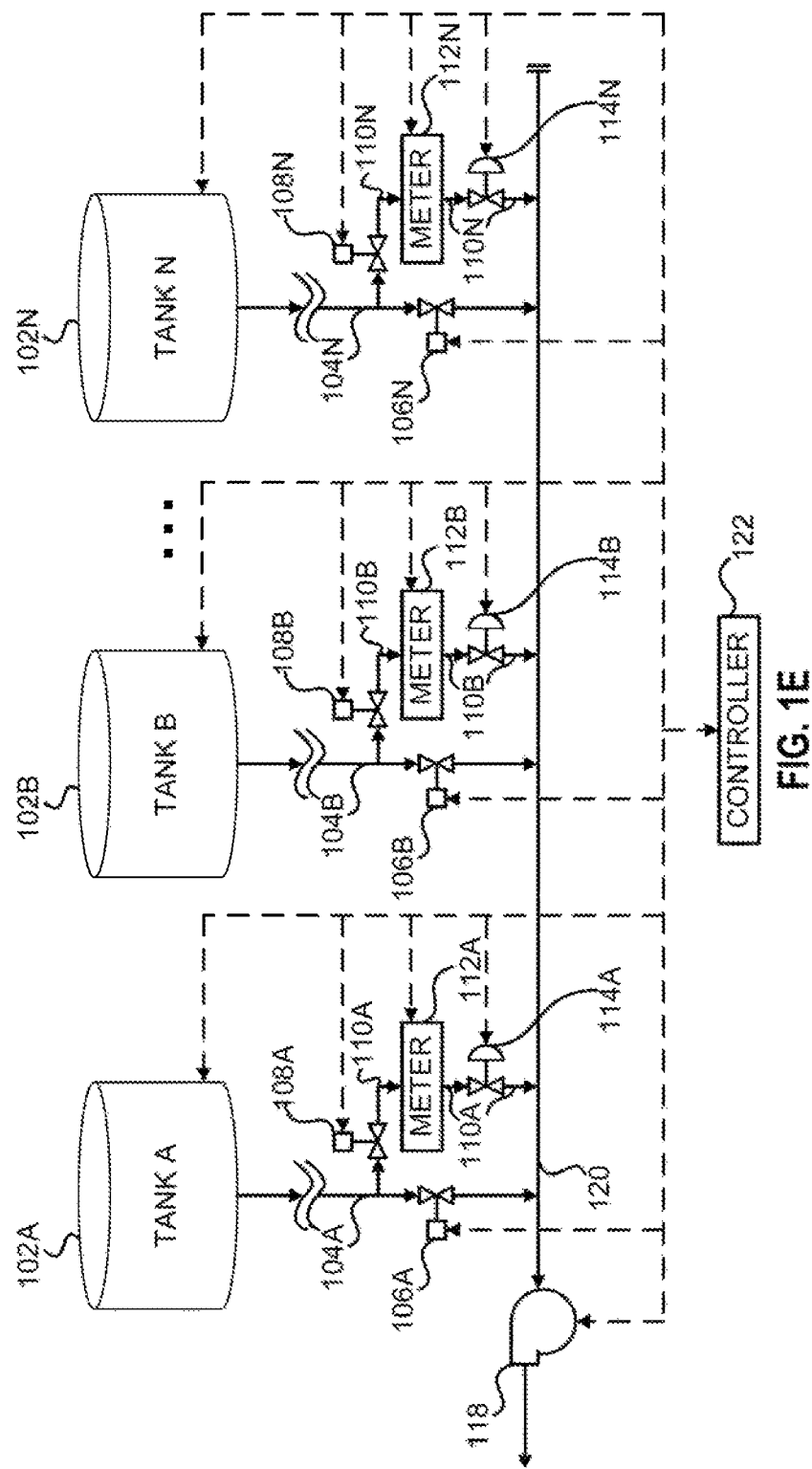

As depicted in FIG. 1C, the in-line mixing system may include other meters or sensors disposed in varying other locations. The in-line mixing system may include tank meters 124A-124N to measure the level in a corresponding tank 102A-102N. The level of a tank may change over time based on various actions (e.g., fluid flowing from a tank or fluid filling the tank). The tank level may offer an indication of the flow rate or how a flow rate may change to a controller 122. Based on such an indication, the controller 122 may send signals to control valves 114A-114N to adjust to maintain a particular blend ratio during a two or more component blending operation. The in-line mixing system may additionally include a meter and/or sensor 126A-126N downstream of a corresponding tank 102A-102N. Such meters and/or sensors 126A-126N may measure some other characteristic of the fluid, e.g., flow, viscosity, density, pressure, temperature, and/or some other characteristic. Based on such measurements, the controller 122 may transmit signals to the control valves 114A-114N to adjust to maintain a particular blend ratio during a two or more component blending operation based on the additional measurements and/or characteristics of the fluids.

In an example, the meters and/or sensors positioned throughout the in-line mixing system may be hydrometers, gravitometers, densitometers, density measuring sensors, gravity measuring sensors, pressure transducers, flow meters, mass flow meters, Coriolis meters, viscometers, optical level switches, ultrasonic sensors, capacitance based sensors, other measurement sensors to determine a density, gravity, flow, tank level, or other variable as will be understood by those skilled in the art, or some combination thereof. In such examples, the meters and/or sensors may measure the density and/or gravity of a liquid, the flow of the liquid, the pressure of the liquid, the viscosity of the liquid, and/or a tank level. As noted above, the controller 122 may be in signal communication with the sensors or meters. The controller 122 may poll or request data from the meters and/or sensors at various points in a blending operation or process. The meter and/or sensor may be in fluid communication with a liquid to measure the density, gravity, or flow rate or may indirectly measure density, gravity, or flow rate (e.g., an ultrasonic sensor). In other words, the sensor or meter may be a clamp-on device to measure flow and/or density indirectly (such as via ultrasound passed through the pipe to the liquid).

Figure 1F:
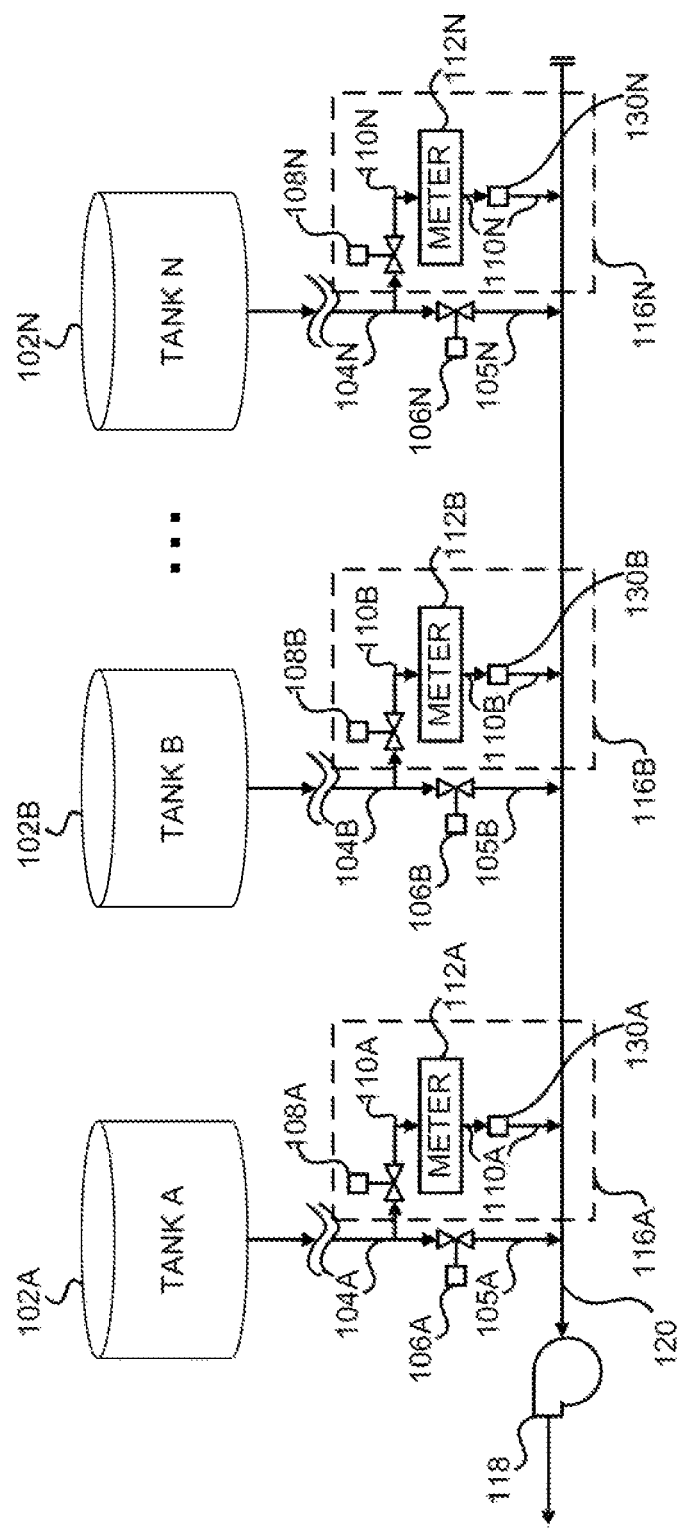

As depicted in FIG. 1F, rather than or in addition to the mixing jumpers 116A-116N utilizing a control valve, the mixing jumpers 116A-116N may utilize a flow control device 130A-130N (also referred to as a mechanical flow controller, a flow control apparatus, and/or flow control subsystem). The flow control device 130A-130N may include a pump, a meter, a pressure transducer, a flow control valve, and/or some combination thereof. In another example, any of the meters and/or sensors of the in-line mixing system may be included with or a part of the flow control device 130A-130N. In such examples, each component of the flow control device 130A-130N may be in signal communication with the controller 122. The flow control device 130A-130N may allow for mix ratio adjustments of the liquids being blended thereby to adjust a blend ratio. For example, the flow control device 130A-130N may, as noted, include a flow control valve. The flow control valve may adjust the flow and/or pressure of the liquid based on opening or closing/pinching the flow control valve. In another example, the flow control device 130A-130N may include a pump and variable speed drive. The variable speed drive may increase/decrease the speed of the pump to increase/decrease the flow rate of a liquid to adjust the ratio of liquids to be blended.

The in-line mixing system, as noted may include a mixing pipe 120. The mixing pipe 120 may include one or more connections to allow connections between the mixing pipe 120 and corresponding main pipes 104A-104N thereby enabling fluid communication between the mixing pipe 120 and corresponding main pipes 104A-104N. A booster pump 118 may be positioned downstream of each connection thereby pumping blended fluid to a location further downstream. The mixing pipe 120 may be a header. A header may be defined as a pipe arrangement that connects flowlines from several sources (e.g., tanks 102A-102N) into a single gathering line. In another embodiment, the mixing pipe 120 may include, for example, a static in-line mixing element or other mixing element configured to further incorporate and/ or blend two or more fluids.

In an embodiment, the ratio of the flow of a second fluid to the flow of a first fluid, and potentially third, fourth, or more fluids, may be referred to herein as the mix ratio or blend ratio of the blended fluid flow. In some embodiments, the mix ratio may be varied in the range of about 1:99 (second fluid:first fluid) to about 99:1 (second fluid:first fluid). For example, in some embodiments, the blended fluid flow may include the flow of the second fluid in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more. In some embodiments, the blended fluid flow may include the flow of the first fluid in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more. Varying percentages for multi-component blends may be utilized, e.g., 60:30:10, 30:30:40, 20:20:20:20, etc.

FIG. 2A, FIG. 2B, FIG. 2C, and FIG. 2D depict process diagrams of a non-limiting, N-component in-line mixing system positioned at a tank farm to admix up to N amount of hydrocarbon liquids from separate tanks into a single pipeline, according to embodiments of the disclosure. The in-line mixing system of FIGS. 2A-2D include similar or the same components as those illustrated in FIGS. 1A-1F. For example, the in-line mixing system of FIGS. 2A-2D may include a plurality of tanks, such as tank A 102A, tank B 102B, and up to tank N 102N. Each of the tanks 102A-102N may include an outlet or port connected to a first end of a first main pipe 104A-104N. The first main pipe 104A-104N may connect to the inlets of two isolation valves, e.g., an isolation valve 106A-106N for single component blends and an isolation valve 108A-108N of a mixing jumper 202A-202N for multiple component blends.

For example, if a multiple component blend is specified for a particular blend or blending operation, each isolation valve 106A-106N corresponding to tanks 102A-102N utilized in the blend or blending operation may be closed, while the isolation valves 108A-108N corresponding to tanks 102A-102N utilized in the blend or blending operation may be opened. In such an example, fluid may flow from the tanks 102A-102N through the first main pipe 104A-104N to the isolation valve 108A-108N and through the isolation valve 108A-108N into the mixing jumper 202A-202N. The mixing jumpers 202A-202N may then adjust control valves 114A-114N to drive the blend or mixture in the mixing pipe 120 to a specified blend ratio (e.g., based on characteristics provided by meters 112A-112N and/or other meters and/or sensor positioned throughout the in-line mixing system).

Rather than the outlet of the mixing jumper 202A-202N connecting at a point along the mixing pipe 120, the mixing jumper 202A-202N may connect at a point along the second main pipe 105A-105N downstream of the isolation valve 106A-106N. In other words, flow of fluid may be controlled via a mixing jumper 202A-202N bypassing the isolation valve 106A-106N. In such examples, the fluid flowing from the mixing jumpers 202A-202N may flow to the second main line 105A-105N at a point downstream of the isolation valve 106A-106N. Further, the particular connection point (e.g., along the second main pipe 105A-105N or mixing pipe 120) may be determined based on physical factors of the in-line mixing system. For example, the mixing jumper 202A-202N may be positioned at a substantial distance from the mixing pipe 120 (e.g., 50 feet, 100 feet, 200 feet, 300 feet, or even further). As such, running a pipe from the mixing jumper 202A-202N to the mixing pipe 120 may not be economical or, in some cases, physically possible. While the configuration described and depicted for FIGS. 1A-1F may depict the mixing jumper 116A-116N (e.g., from the mixing jumper pipe 110A-110N to the mixing pipe 120), the configuration of the in-line mixing system for FIGS. 2A-2D may utilize less material (e.g., pipe). Further, the configuration in FIGS. 2A-2D may be utilized when space or real estate is limited at a site or tank farm. For example, a mixing pipe or header at an existing tank farm may include little to no available space based on current pipe connections. As such, the configurations depicted in FIGS. 2A-2D may be a configuration to utilize space apart or separate from the mixing pipe or header.

In an embodiment, the mixing jumpers 202A-202N of FIGS. 2A-2D or the mixing jumpers 116A-116N of FIGS. 1A-1F may be included in kits to be added to existing tank farm infrastructure. Such a kit may include each component and/or part illustrated of the mixing jumpers 202A-202N of FIGS. 2A-2D or the mixing jumpers 116A-116N of FIGS. 1A-1F. In another embodiment, the mixing jumpers 202A-202N of FIGS. 2A-2D or the mixing jumpers 116A-116N of FIGS. 1A-1F may be constructed or installed along with a newly constructed tank farm. In yet another embodiment, some tanks at a tank farm may include the mixing jumpers 202A-202N of FIGS. 2A-2D or the mixing jumpers 116A-116N of FIGS. 1A-1F, while other tanks may not. In such embodiments, some tanks at the tank farm may provide gravity-fed streams, via pipe sized similarly to the mixing jumper pipe used in the mixing jumpers, to the mixing pipe 120.

Figure 2B:
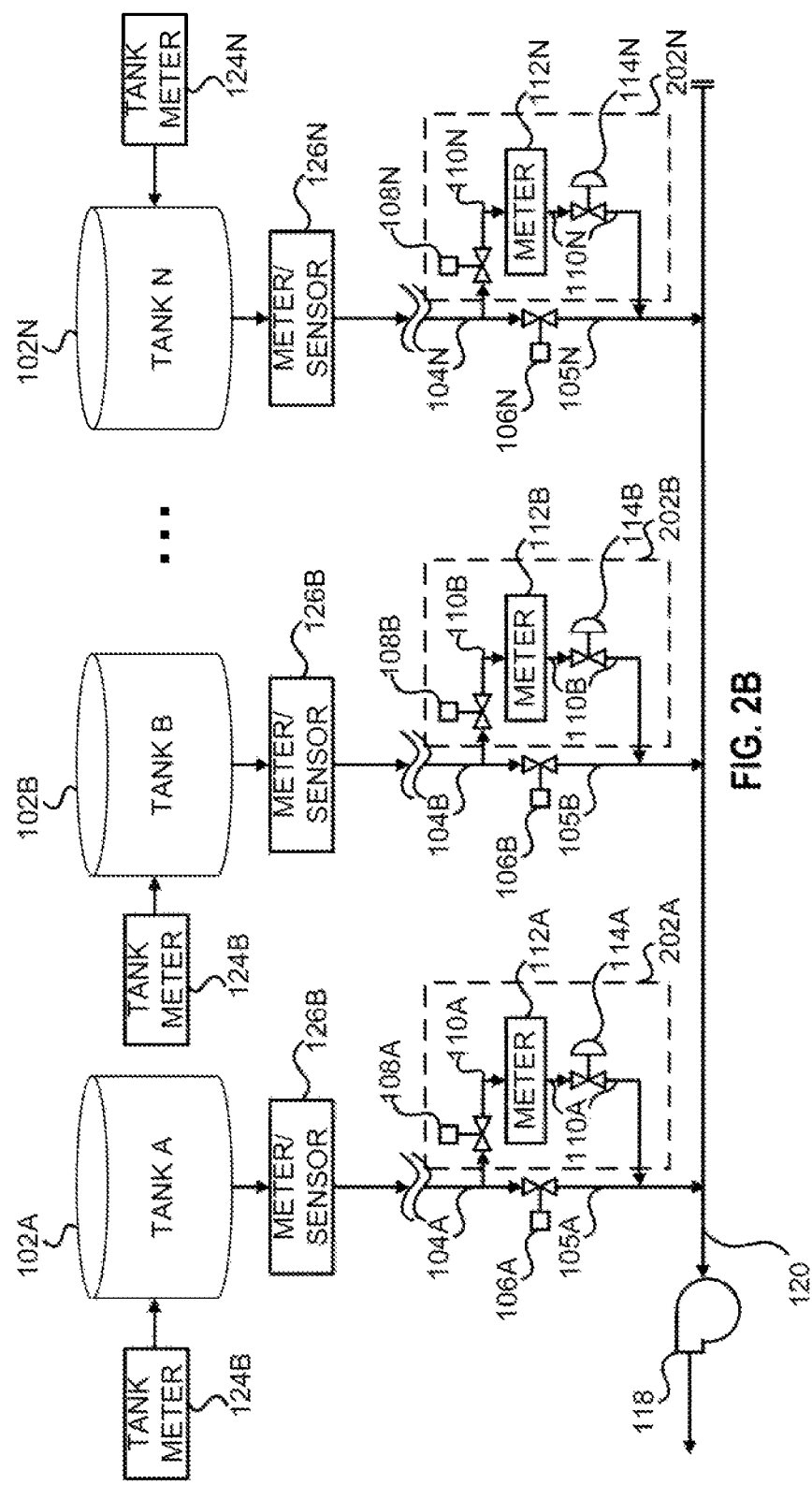
Figure 2C:
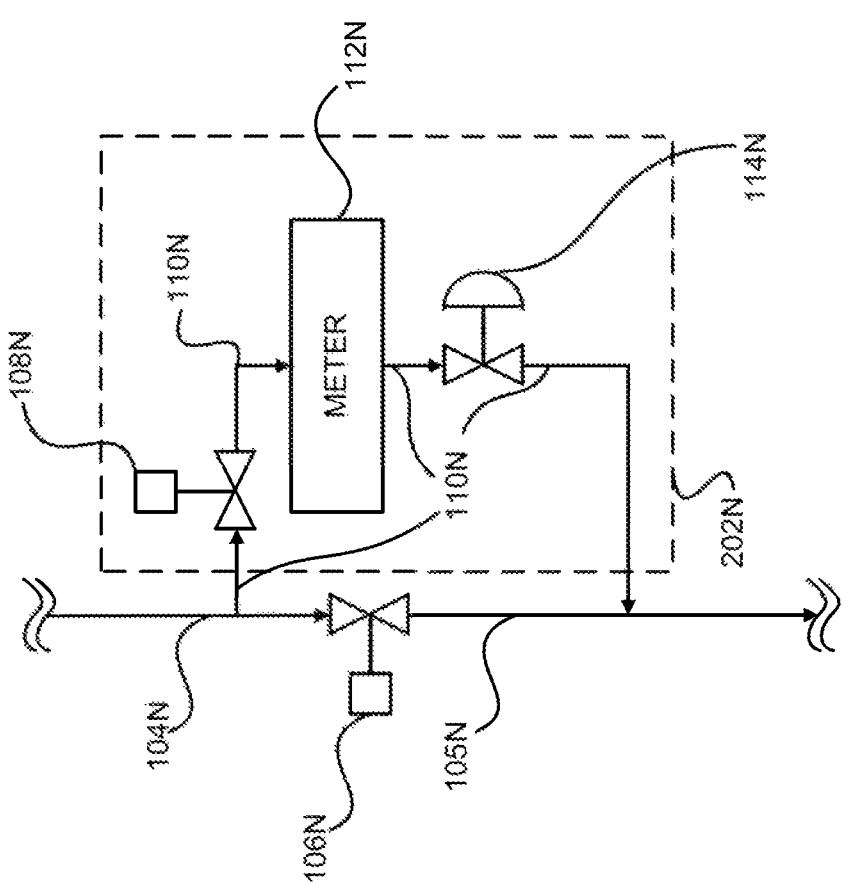
Figure 2D:
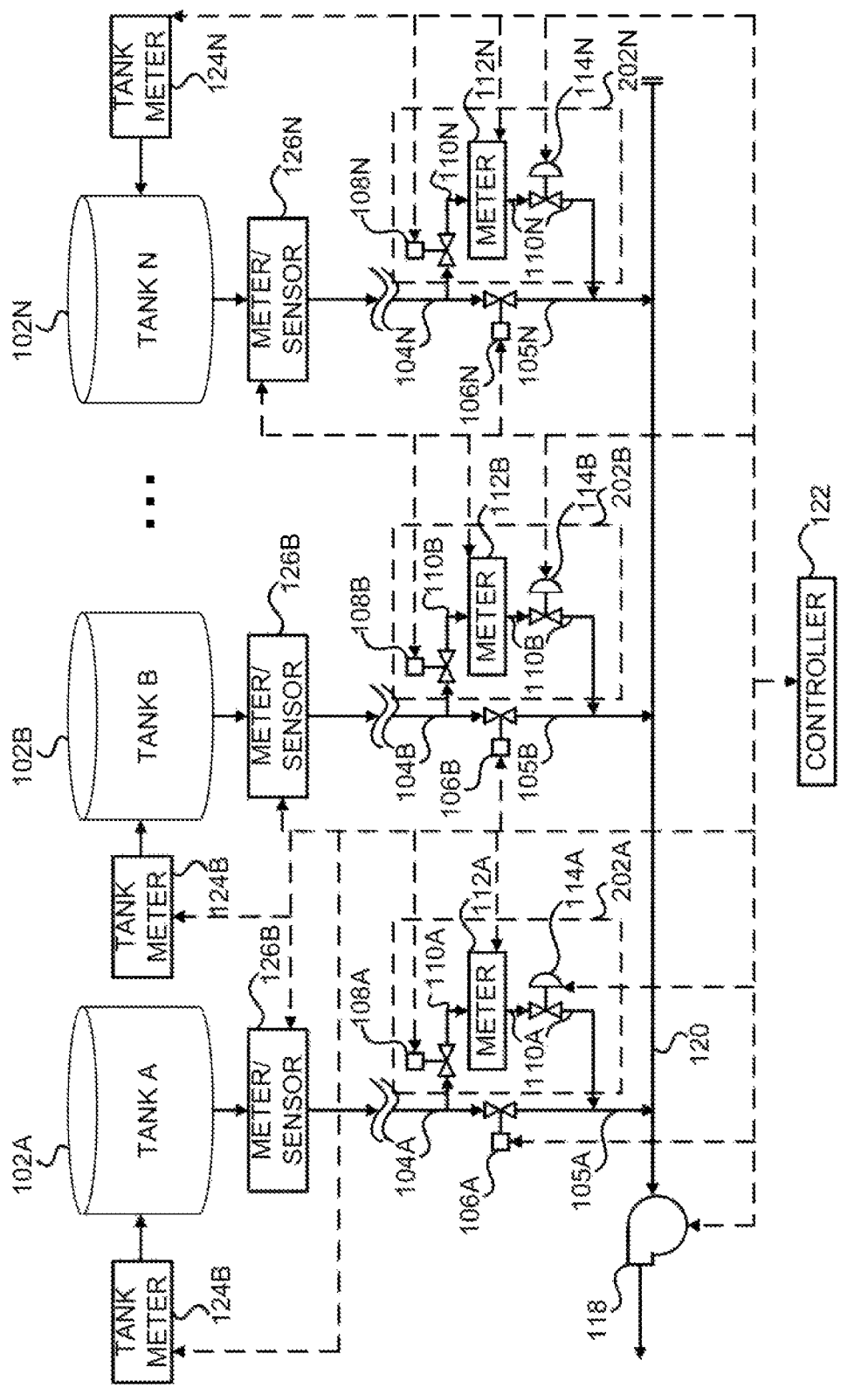

Further, FIG. 2D illustrates an in-line mixing system with a controller 122 and additional meters and/or sensors (e.g., tank meter 124A-124N and meters and/or sensors 126A-126N). Such meters and/or sensors may be utilized by the controller 122 to determine how to adjust the control valves 114A-114N to utilized in a blend or blending operation. In another embodiment, a meter or sensor may be positioned downstream of where the mixing jumper 202A-202N connects to the second main pipe 105A-105N, rather than in the mixing jumper 202A-202N. In such examples, the meter or sensor may, in addition to determining characteristics of a fluid from the mixing jumper 202A-202N, determine the same characteristic flowing through the isolation valve 106A-106N. Another meter or sensor may be positioned along the mixing pipeline 120, for example, immediately upstream or downstream of the booster pump 118. Such a meter or sensor may be utilized by the controller 122 to determine additional characteristics of a blend or mixture to be utilized in a blend or blending operation.

Figure 3A:
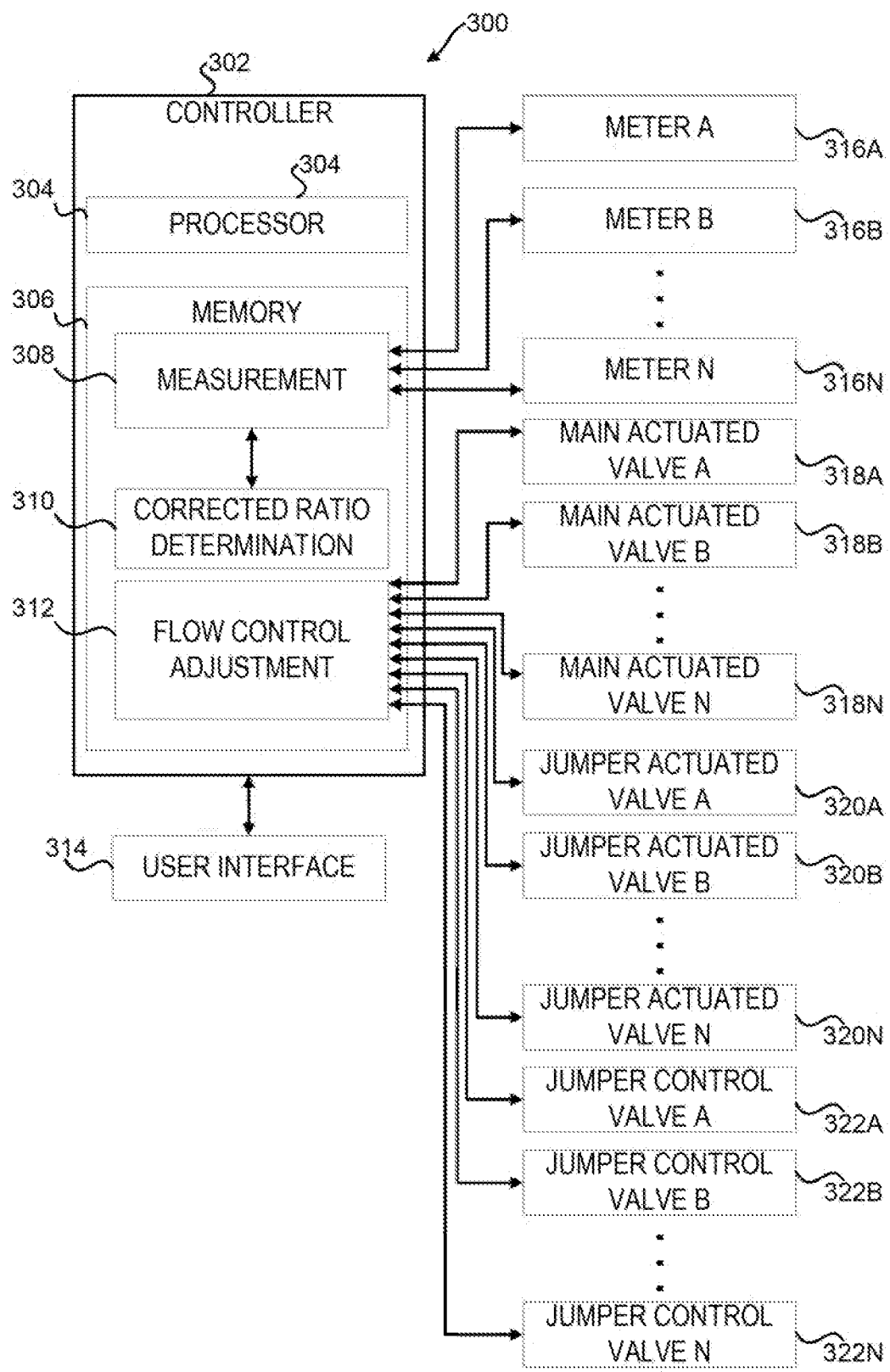
FIG. 3A and FIG. 3B are simplified block diagrams illustrating control systems for managing a multi-component in-line mixing system, according to embodiments of the disclosure.
Figure 3B:
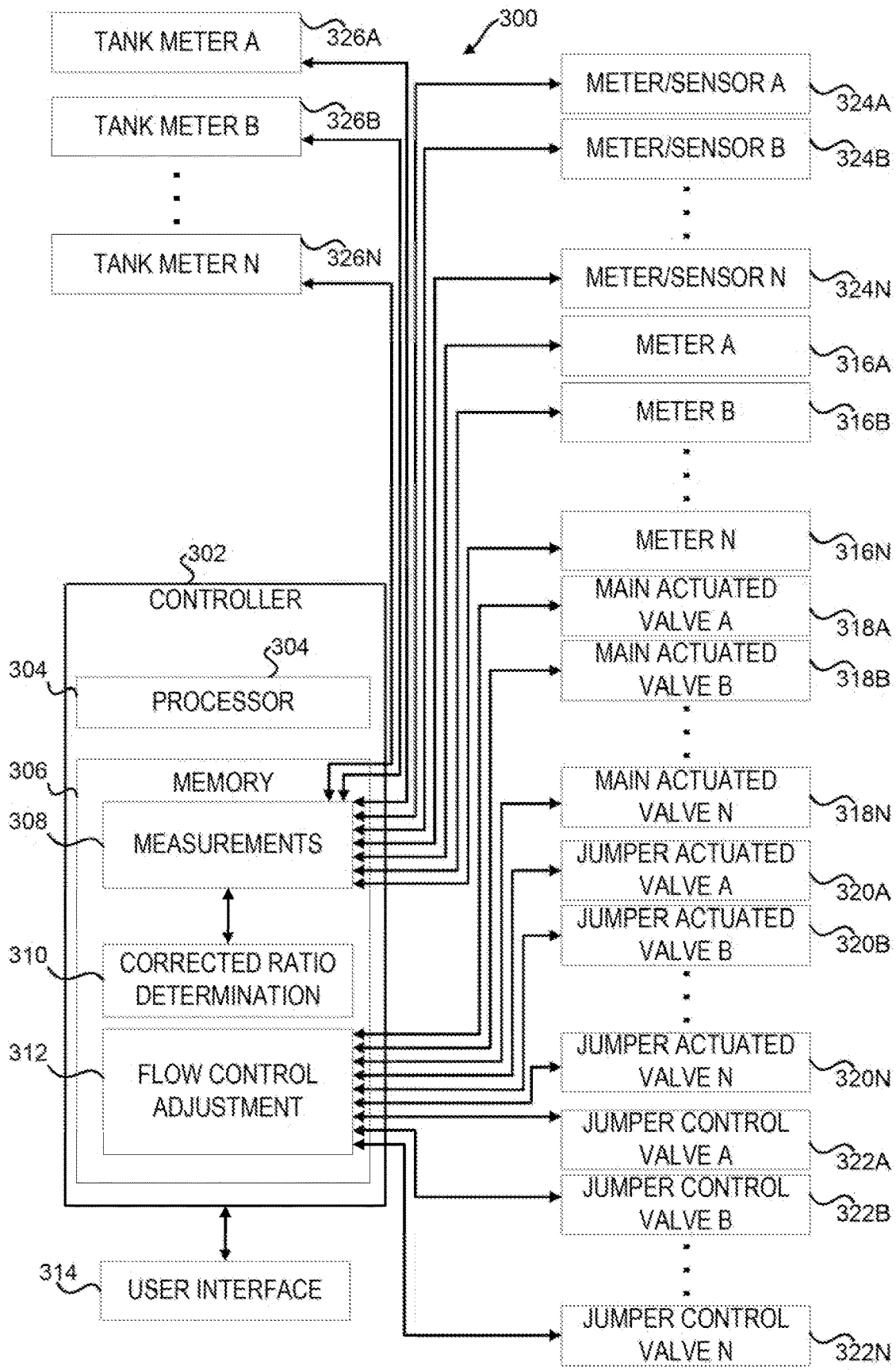

FIG. 3A and FIG. 3B are simplified diagrams illustrating control systems for managing a multi-component in-line mixing system, according to an embodiment of the disclosure. The control system, as described herein, may be a controller 302, one or more controllers, a PLC, a SCADA system, a computing device, and/or other components to manage a blending operation. The controller 302 may include one or more processors (e.g., processor 304) to execute instructions stored in memory 306. In an example, the memory 306 may be a machine-readable storage medium. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 306 may store or include instructions executable by the processor 304. As used herein, a "processor" may include, for example one processor or multiple processors included in a single device or distributed across multiple computing devices. The processor 304 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, forms of near field communications, or other wireless communication methods as will be understood by those skilled in the art. In addition, signal communication may include one or more intermediate controllers, relays, or switches disposed between elements that are in signal communication with one another.

As noted, the memory 306 may store instructions executable by the processor 304. The instructions may include instructions 308. Such instructions 308 may determine various characteristics of fluid flowing within the in-line mixing system 300. The controller 302 may poll various meters and/or sensors positioned throughout the in-line mixing system 300 continuously, substantially continuously, or at a specified interval. For example, and as illustrated in FIG. 3A, the controller 302 may receive measurements from meters 316A-316N, e.g., via an input. As illustrated in FIG. 3B, the controller may receive, in addition to or separate from measurements from meters 316A-316N, measurements from tank meters 326A-326N and/or meters/sensors 324A-324N, e.g., via an input. Such measurements may include a tank level, flow rates of fluids at various points within the in-line mixing system 300, density or gravity of each liquid within the in-line mixing system 300, temperature and/or viscosity of each liquid within the in-line mixing system 300, and/or any other relevant characteristic of the fluid within the in-line mixing system 300.

The memory 306 may store instructions 310 to determine a corrected ratio of fluids being mixed in a blending operation. The corrected ratio may be based on a specified blend ratio (e.g., a ratio of fluids to be blended at specific percentages for a blending operation), the previous determined blend ratio, the currently measure characteristics of the fluid within the in-line mixing system. Using the currently determined blend ratio and the specified blend ratio, the controller 302 may determine a corrected blend ratio. The corrected blend ratio may include indications as to what particular flow rates may require adjustment (e.g., what position a control may be adjusted to, to drive a blend to the corrected ratio). In some examples, the signal may include positions of control valves (e.g., the position one or more of the control valves may adjust to, to drive a blend to the corrected ratio), speed of a pump (e.g., to increase or decrease a particular component of a blend), or adjustment of another flow control device of the in-line mixing system 300.

The memory 306 may include instructions 312. Instructions 312 may include transmitting a signal to a device indicating a position for the device to adjust to, to control flow of liquid through the mixing jumper (e.g., via adjusting position of a jumper control valve 322A-322N). The signal may be transmitted from an output or input/output of the controller 302 to the device. Other flow control devices may be adjusted. Such adjustments may drive a blend to the corrected blend ratio and thus to the specified blend ratio. In other words, flow may be increased or decreased through one particular mixing jumper, while increased or decreased in another mixing jumper to correct an altered blend ratio (e.g., such alteration occurring based on various factors, such as variable flow rates based on operating conditions or tank levels and/or other factors). For example, the controller 302 may poll a tank level meter or gauge periodically (e.g., determine a tank level at selected times or substantially continuously). As the tank level decreases overtime, the controller 302 may automatically adjust an open position of a corresponding control valve to offset any fluid flow rate reduction based on the measured tank level (e.g., increase the open position to adjust for decreasing tank levels and/or decrease open position to adjust for increasing tank levels).

In an embodiment, the memory 306 may include instructions related to blend operation initiation. Such instructions may include the opening or closing of isolation valves (e.g., main isolation valves 318A-318N, also referred to as a main valve, and jumper isolation valves 320A-32N, also referred to as a jumper valve). For example, for a single fluid operation, a main isolation valve corresponding to a tank in the operation may open, while the corresponding jumper control valve may close. In another embodiment, for a multiple component blend, the controller may indicate to two or more main isolation valves to close and two or more jumper control valves to open.

In another embodiment, the memory 306 may store instructions to drive flow rates of any particular fluid utilized in a blend operation to a specific set point. For example, a user may set a specific flow rate for two or more different fluids for a particular blend operation. The controller 302 may determine, based on meters and/or sensors positioned at each mixing jumper, a flow rate. If the flow rate does not match, the controller 302 may transmit a signal to any particular control valve to adjust the flow rate of a corresponding fluid to the set point flow rate.

Figure 4:
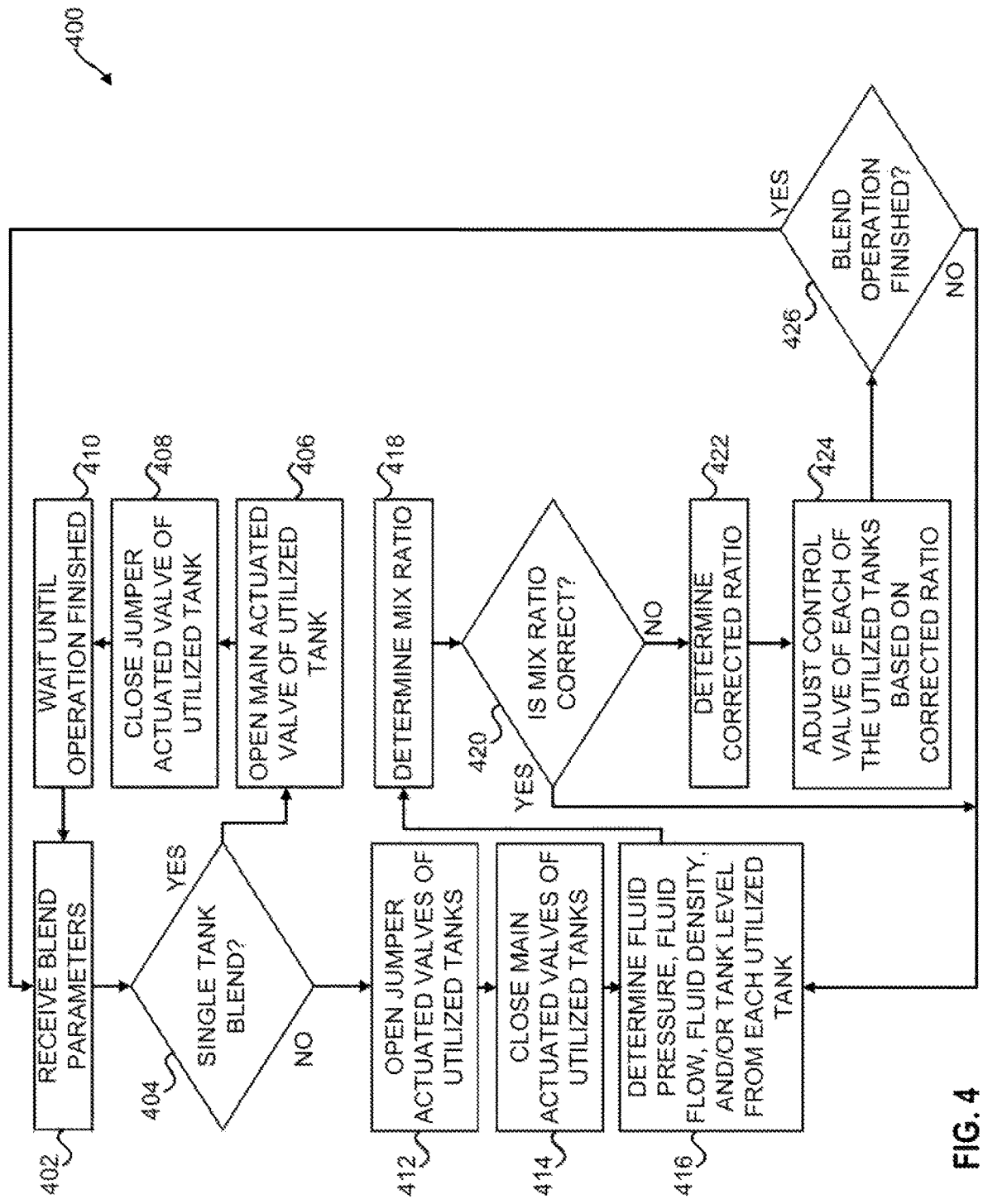
FIG. 4 is a flow diagram of a method for managing a multi-component in-line mixing system, according to an embodiment of the disclosure.

FIG. 4 is a flow diagram, such as implemented in a controller, of a method 400 for managing a multi-component in-line mixing system according to an embodiment of the disclosure. according to an embodiment of the disclosure. The method 400 is detailed with reference to the controller 302 and in-line mixing system 300 of FIG. 3. Unless otherwise specified, the actions of method 400 may be completed within the controller 300, for example, but it also may be implemented in other systems and/or computing devices as will be understood by those skilled in the art. Specifically, method 400 may be included in one or more programs, protocols, or instructions loaded into the memory 306 of the controller 302 and executed on the processor 304 or one or more processors of the controller 302. The order in which the operations are described is not intended to be construed as a limitation, and any number of the described blocks may be combined in any order and/or in parallel to implement the method 400.

At block 402, a controller 302 may receive blend parameters for a blending operation. The blend parameters may include a ratio of one or more different liquids from one or more corresponding tanks. The blend parameters may additionally include a length of time of the blend operation. Other factors or variables may be included in the blend parameters, including type of fluids, gravity or density of the fluids, and/or other relevant information. Blend parameters may be received from other computing devices or controllers or, in another embodiment, from a user interface 314.

At block 404, the controller 302 may determine whether the blend is a single component blend or, in other words, whether the desired end product includes a single type of fluid. Such a determination may be made based on the blend parameters received or based on input received at a user interface 314.

At block 406, if the blend operation includes a single tank, the controller may transmit a signal to a corresponding main isolation valve to open. As no other tanks may be utilized in such an operation, the corresponding main isolation valve may receive the signal, rather than all main isolation valves.

At block 408, after the main isolation valve is open, the controller 302 may transmit a signal to the jumper isolation valve to close. The controller 302 may transmit such a signal to the corresponding jumper isolation valve, rather than all jumper isolation valves. At block 410, controller 302 may wait until such an operation is finished. Once the operation is finished, the controller 302 may wait until new blend parameters are received.

At block 412, if the blend includes two or more tanks, the controller 302 may transmit a signal to corresponding jumper isolation valves to open. At block 414, the controller 302 may transmit a signal to corresponding main isolation valves to close.

At block 416, after the blending operation has been initiated, the controller 302 may measure a fluid pressure, fluid flow, fluid density, and/or a tank level for each tank utilized. Such received characteristics or measurements may depend on the type of meters and/or sensors included in the in-line mixing system.

At block 418, based on the received characteristics, the controller 302 may determine a current mix ratio (e.g., the current blend ratio of the blending operation). At block 420, the controller may determine whether the mix ratio is correct or within a percentage of error (e.g., 0.1%, 0.2%, 0.3%, or up to 1%). If the mix ratio is not correct, the controller 302 may move to block 422. If the mix ratio is correct, the controller 302 may move to block 426.

At block 422, the controller 302 may determine a corrected ratio. The correct ratio may be based on the received blend parameters and the current mix ratio. At block 424, the controller 302, based on the corrected ratio, may adjust corresponding control valves. At block 426, the controller 302 may determine whether the blend operation is finished. If the operation is not finished, the controller 302 may continue to check measurements and adjust accordingly, otherwise the controller 302 may wait to receive new blend parameters.

FIG. 5 is another flow diagram, such as implemented in a controller, of a method 500 for managing a multi-component in-line mixing system according to an embodiment of the disclosure. according to an embodiment of the disclosure. The method 500 is detailed with reference to the controller 302 and in-line mixing system 300 of FIG. 3. Unless otherwise specified, the actions of method 500 may be completed within the controller 300, for example, but it also may be implemented in other systems and/or computing devices as will be understood by those skilled in the art. Specifically, method 500 may be included in one or more programs, protocols, or instructions loaded into the memory 306 of the controller 302 and executed on the processor 304 or one or more processors of the controller 302. The order in which the operations are described is not intended to be construed as a limitation, and any number of the described blocks may be combined in any order and/or in parallel to implement the method 500.

At block 502, a controller 302 may initiate a hydrocarbon liquid process (e.g., a blend operation or blend process). The controller 302 may determine that the hydrocarbon liquid process is to be initiated based on one or more of reception of blend parameters or an input from a user, another controller, or other computing device. Such an input may include a signal indicating that the hydrocarbon liquid process is to begin. The blend parameters may include a ratio of one or more different liquids from one or more corresponding tanks. The blend parameters may additionally include a length of time of the hydrocarbon liquid process. Other factors or variables may be included in the blend parameters, including type of fluids, gravity or density of the fluids, and/or other relevant information. Blend parameters may be received from other computing devices or controllers or, in another embodiment, from a user interface 314.

At block 504, the controller 302 may transmit a signal to main valves (e.g., main valves of tanks to be utilized or corresponding to a hydrocarbon liquid in the hydrocarbon liquid process) to close. At block 506, the controller 302 may transmit a signal to corresponding jumper valves (e.g., jumper valves of tanks to be utilized or corresponding to a hydrocarbon liquid in the hydrocarbon liquid process) to open. Once the jumper valves are open and the main valves are closed, the controller 302 may begin the hydrocarbon liquid process (e.g., the controller 302 or a user opening a port or valve (via manual actuation or based on a signal received from the controller 302) on a tank to allow a hydrocarbon liquid to flow from the tank to the jumper valves).

At block 508, after the hydrocarbon liquid process has begun, the controller 302 may measure a flow rate of each hydrocarbon liquid flowing to a mixing pipe or pipeline or header. The controller 302 may additionally measure fluid pressure, fluid density, and/or a tank level for each tank utilized. Such received characteristics or measurements may depend on the type of meters and/or sensors included in the in-line mixing system.

At block 510, based on the received flow rate and/or other characteristics, the controller 302 may determine a current mix ratio (e.g., the current blend ratio of the blending operation) and determine whether the current mix ratio is different (e.g., within a percentage of error, such as within 0.1%, 0.2%, 0.3%, or up to 1%) than a selected or pre-set mix ratio (e.g., the selected or pre-set mix ratio, for example, included in the blend parameters). If the mix ratio is not different or is within a percentage of error, the controller 302 may move to block 516 and determine whether the hydrocarbon liquid process is finished or complete. If the mix ratio is different or not within a percentage of error, the controller 302 may move to block 512 to determine a corrected ratio.

At block 512, the controller 302 may determine a corrected ratio. The correct ratio may be based on the received blend parameters and the current mix ratio. At block 514, the controller 302, based on the corrected ratio, may adjust corresponding control valves. At block 516, the controller 302 may determine whether the hydrocarbon liquid process is finished. If the operation is not finished, the controller 302 may continue to check measurements and adjust accordingly, otherwise the controller 302 may wait to receive new blend parameters or initiate another hydrocarbon liquid process.

In the drawings and specification, several embodiments of systems and methods to provide in-line mixing of hydrocarbon liquids have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed is:

1. A method of admixing liquid from two or more tanks into a single pipeline to provide in-line mixing thereof, the method comprising: initiating a hydrocarbon liquid process that includes blending specified percentages of two or more hydrocarbon liquids over a period of time each of the two or more hydrocarbon liquids stored in one of two or more tanks; closing, for each one of the two or more tanks, a main valve; opening, for each one of the two or more tanks, an isolation valve of a mixing jumper; determining, for the mixing jumper of each one of the two or more tanks, a flow rate of hydrocarbon liquid; and in response to a difference between a mix ratio and a ratio of each determined flow rate of hydrocarbon liquid: determining a corrected ratio based on one or more of the difference between the mix ratio, the ratio of each determined flow rate of hydrocarbon liquid, or one or more of each flow rate of each hydrocarbon liquid, and adjusting a flow control device of the mixing jumper for each of the two or more tanks based on the corrected ratio to modify flow rate of hydrocarbon liquid to drive the ratio towards a target ratio.

2. The method of claim 1, wherein the flow control device comprises one or more of a control valve, and wherein the flow rate of hydrocarbon liquid is adjusted based on an opened/closed position of the control valve.

3. The method of claim 1, wherein determining the flow rate of the hydrocarbon liquid includes determining the flow rate via a flow meter.

4. The method of claim 1, further comprising determining a tank level for each one of the two or more tanks.

5. The method of claim 4, wherein the corrected ratio further is based on the tank level for each of the two or more tanks.

6. A method of admixing liquid from two or more tanks into a single pipeline to provide in-line mixing thereof, the method comprising: receiving blend parameters of a blend process that includes specified percentages of one or more hydrocarbon liquids; in response to blend parameters with two or more specified percentages of two or more hydrocarbon liquids, each of the two or more hydrocarbon liquids stored in corresponding tanks: opening, for each of the corresponding tanks, a jumper valve of a mixing jumper; closing, for each of the corresponding tanks, a main valve; determining, for the mixing jumper of each of the corresponding tanks, a flow rate of hydrocarbon liquid; and in response to a difference between a mix ratio and a ratio of each determined flow rate of hydrocarbon liquid: determining a corrected ratio based on one or more of the difference between the mix ratio, the ratio of each determined flow rate of hydrocarbon liquid, or one or more of each flow rate of each hydrocarbon liquid, and adjusting a flow control device of the mixing jumper for each of the corresponding tanks based on the corrected ratio to modify flow rate of hydrocarbon liquid to drive the ratio towards a target ratio.

7. The method of claim 6, further comprising:
in response to blend parameters with a specified percentage of one hydrocarbon liquid:
opening, for a corresponding tank, a main actuated valve to allow the one hydrocarbon liquid to flow to a header therethrough for a selected time, and
closing, for the corresponding tank, a jumper actuated valve of a mixing jumper to prevent flow of the one hydrocarbon liquid through the mixing jumper.

8. The method of claim 6, wherein the corrected ratio further is based on one or more of: (a) a density of each of the two or more hydrocarbon liquids, or (b) a level of hydrocarbon liquid in each of the corresponding tanks.

\* \* \* \* \*